(12) United States Patent
Laird et al.

(10) Patent No.: US 9,194,456 B2
(45) Date of Patent: *Nov. 24, 2015

(54) SUSPENSION SYSTEM

(71) Applicant: Fox Factory, Inc., Watsonville, CA (US)

(72) Inventors: Andrew Laird, Los Gatos, CA (US); William Becker, Aptos, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,014

(22) Filed: Nov. 13, 2013

(65) Prior Publication Data
US 2014/0069755 A1 Mar. 13, 2014

Related U.S. Application Data

(63) Continuation of application No. 12/903,022, filed on Oct. 12, 2010, now Pat. No. 8,672,106.

(60) Provisional application No. 61/250,999, filed on Oct. 13, 2009.

(51) Int. Cl.
| | |
|---|---|
| *F16F 9/504* | (2006.01) |
| *F16F 9/10* | (2006.01) |
| *F16F 9/34* | (2006.01) |
| *B62K 25/08* | (2006.01) |
| *F16F 9/092* | (2006.01) |
| *F16F 9/36* | (2006.01) |

(Continued)

(52) U.S. Cl.
CPC . *F16F 9/34* (2013.01); *B62K 25/08* (2013.01); *F16F 9/092* (2013.01); *F16F 9/18* (2013.01); *F16F 9/363* (2013.01); *F16F 9/464* (2013.01); *F16F 9/504* (2013.01); *F16F 13/002* (2013.01); *F16F 13/007* (2013.01)

(58) Field of Classification Search
USPC ............ 188/275, 314, 276, 322.13, 316, 318, 188/319.1–319.2, 266.6, 322.2, 285, 297, 188/315, 322.19, 300; 280/284
IPC ........................................ F16F 9/16,9/44, 9/49
See application file for complete search history.

(56) References Cited

U.S. PATENT DOCUMENTS

| | | |
|---|---|---|
| 2,897,613 A | 8/1959 | Davidson et al. |
| 3,202,413 A | 8/1965 | Colmerauer |

(Continued)

FOREIGN PATENT DOCUMENTS

DE 3709447 A1 10/1988

OTHER PUBLICATIONS

Electronic Translation of DE3709447A1.

*Primary Examiner* — Anna Momper
*Assistant Examiner* — San Aung

(57) ABSTRACT

A suspension system includes a first suspension member movable relative to a second suspension member, a fluid reservoir having a volume, the volume variable in response to a relative movement between the first and second suspension members, and a fluid flow circuit having a first end in fluidic communication with the fluid reservoir and a second end in fluidic communication with an isolated suspension location, the fluid flow circuit comprising a first valve, a second valve and a third valve, wherein said first and third valves are in parallel with each other and the second valve is in series with each of the first and third valves.

24 Claims, 20 Drawing Sheets

(51) Int. Cl.
   *F16F 9/46*    (2006.01)
   *F16F 13/00*   (2006.01)
   *F16F 9/18*    (2006.01)

(56) References Cited

U.S. PATENT DOCUMENTS

| | | | |
|---|---|---|---|
| 3,286,797 | A | 11/1966 | Leibfritz et al. |
| 3,714,953 | A | 2/1973 | Solvang |
| 4,072,087 | A | 2/1978 | Mueller et al. |
| 4,139,186 | A | 2/1979 | Postema et al. |
| 4,333,668 | A | 6/1982 | Hendrickson et al. |
| 4,502,673 | A | 3/1985 | Clark et al. |
| 5,161,653 | A | 11/1992 | Hare, Sr. |
| 5,588,510 | A | 12/1996 | Wilke |
| 5,813,731 | A | 9/1998 | Newman et al. |
| 6,067,490 | A | 5/2000 | Ichimaru et al. |
| 6,293,530 | B1 | 9/2001 | Delorenzis et al. |
| 6,296,092 | B1 | 10/2001 | Marking et al. |
| 6,318,525 | B1 * | 11/2001 | Vignocchi et al. ......... 188/319.2 |
| 6,415,895 | B2 | 7/2002 | Marking et al. |
| 6,427,812 | B2 | 8/2002 | Crawley et al. |
| 6,592,136 | B2 * | 7/2003 | Becker et al. ................. 280/276 |
| 6,966,412 | B2 | 11/2005 | Braswell et al. |
| 6,978,871 | B2 | 12/2005 | Holiviers |
| 7,234,680 | B2 | 6/2007 | Hull et al. |
| 7,325,660 | B2 | 2/2008 | Norgaard et al. |
| 7,591,352 | B2 | 9/2009 | Hanawa |
| 7,628,259 | B2 | 12/2009 | Norgaard et al. |
| 7,722,069 | B2 | 5/2010 | Shirai |
| 7,779,974 | B2 | 8/2010 | Timoney et al. |
| 8,210,330 | B2 | 7/2012 | Vandewal |
| 2002/0121416 | A1 | 9/2002 | Katayama et al. |
| 2005/0098401 | A1 | 5/2005 | Hamilton et al. |
| 2006/0113834 | A1 | 6/2006 | Hanawa |
| 2006/0237272 | A1 * | 10/2006 | Huang ....................... 188/299.1 |
| 2007/0039790 | A1 | 2/2007 | Timoney et al. |
| 2007/0051573 | A1 | 3/2007 | Norgaard et al. |
| 2008/0006494 | A1 | 1/2008 | Vandewal |
| 2009/0001684 | A1 * | 1/2009 | McAndrews et al. ......... 280/276 |
| 2009/0302558 | A1 * | 12/2009 | Shirai ....................... 280/5.515 |
| 2010/0170760 | A1 | 7/2010 | Marking |
| 2011/0214956 | A1 | 9/2011 | Marking |
| 2012/0018263 | A1 | 1/2012 | Marking |
| 2012/0048665 | A1 | 3/2012 | Marking |
| 2012/0222927 | A1 | 9/2012 | Marking |

\* cited by examiner

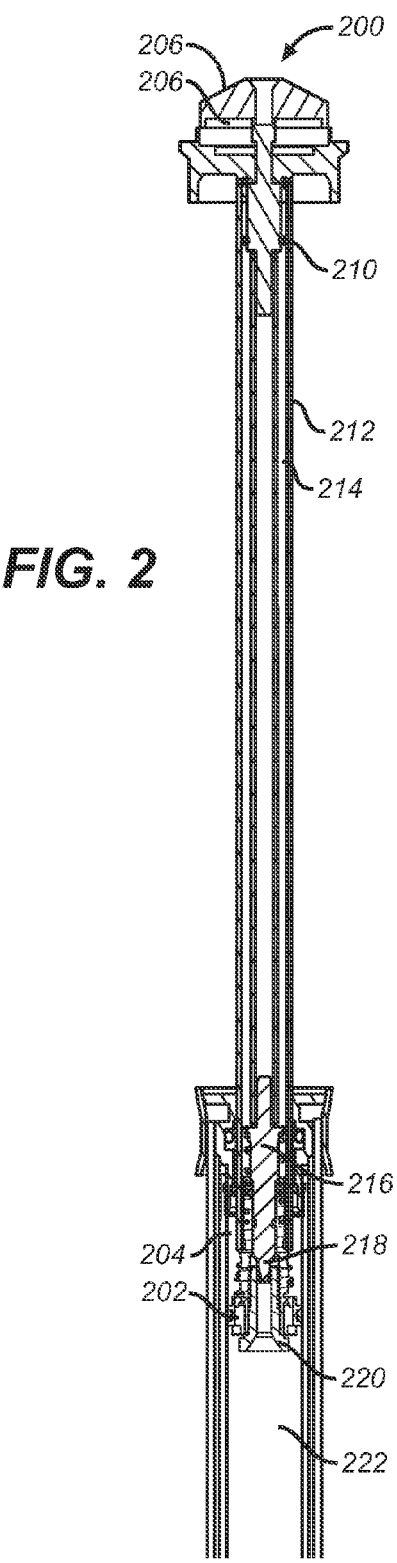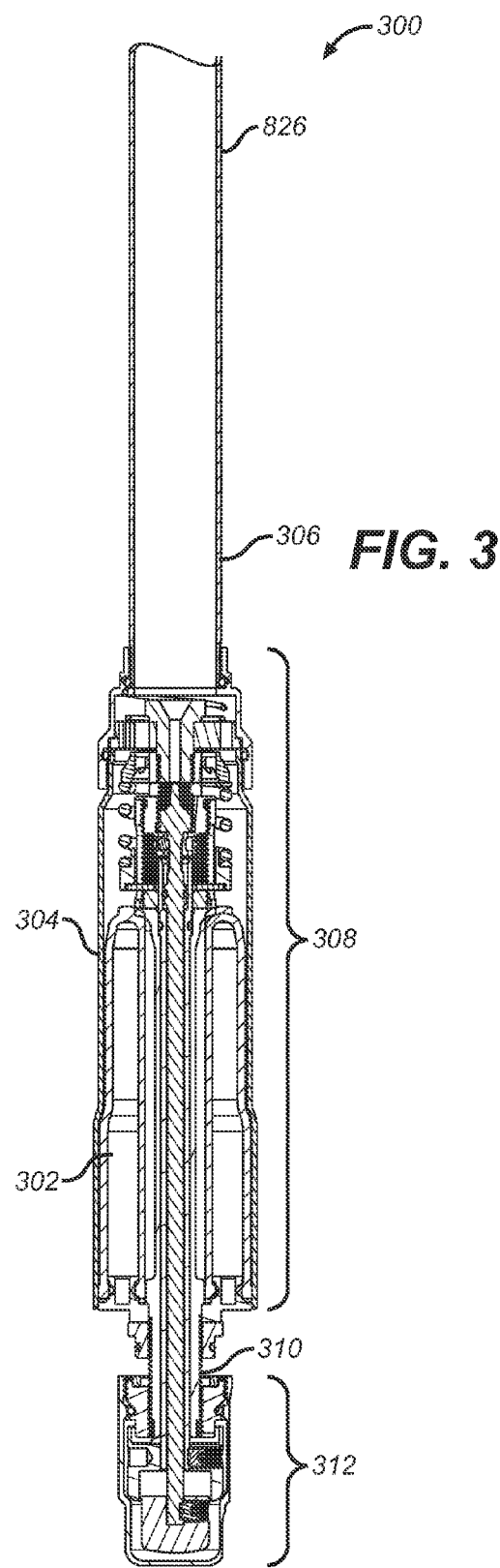

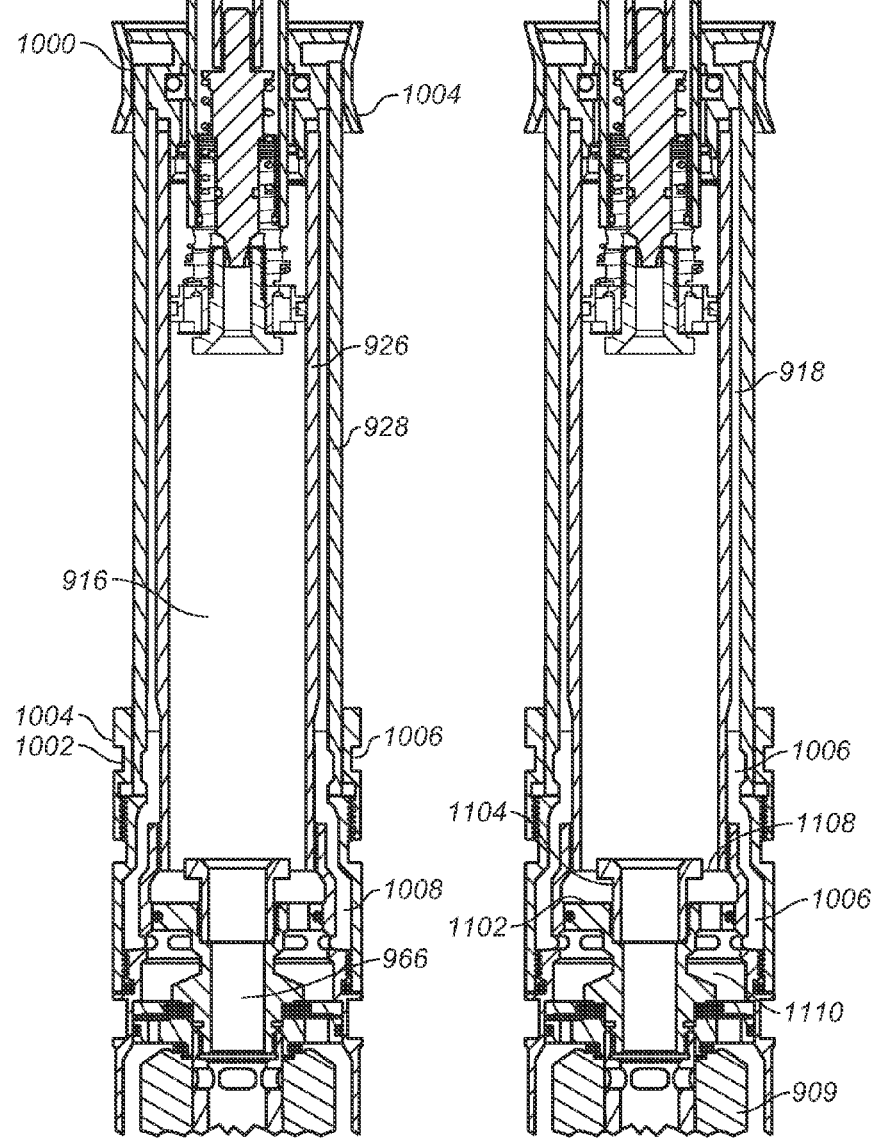

SUSPENSION SYSTEM

CROSS-REFERENCE TO RELATED APPLICATIONS

This application is a continuation application of and claims the benefit of U.S. patent application Ser. No. 12/903,022 filed on Oct. 12, 2010 entitled "SELF-REGULATING SUSPENSION" by Andrew Laird, which is incorporated herein, in its entirety, by reference and is assigned to the assignee of the present application, which application claims priority to and the benefit of U.S. Provisional Patent Application 61/250,999 filed on Oct. 13, 2009 entitled "SELF-REGULATING SUSPENSION" by Andrew Laird, which is incorporated herein, in its entirety, by reference and is assigned to the assignee of the present application.

FIELD OF THE INVENTION

Embodiments of the invention generally relate to methods and apparatus for use in suspension assemblies. Particular embodiments of the present technology relate to methods and apparatus useful for adjusting damping characteristics of vehicle suspension systems.

BACKGROUND

Vehicles, including wheeled vehicles, are typically suspended to absorb shock encountered while traversing uneven terrain. Fundamental vehicle suspensions for controlling vehicle body motion and handling characteristics during vehicle travel over uneven surface are well-known in the art. Wheeled vehicles usually include one vehicle suspension assembly per wheel so that each wheel may absorb shock independently. Vehicle suspensions typically comprise many components, including a hydraulic cylinder with an internal piston connected to a central piston rod, which reciprocates within the cylinder to produce damping forces.

Damping forces created by the vehicle suspension have a major influence on the overall dynamic performance of a vehicle. A wide range of dynamic conditions are encountered during typical vehicle motion over various surface and terrain features. For example, these features and conditions include large and small bumps, sharp-edged bumps and round-edged bumps, close-spaced bumps and wide spaced bumps, stutter bumps and gradual undulating bumps, dips, depressions, crevices and so forth. Thus, the vehicle suspension undergoes a wide range of tough conditions that puts pressure on the functionality of its internal components. What is needed are vehicle suspension assemblies that better accommodate these performance requirements, as there exists many limitations to the present state of vehicle suspension technology.

BRIEF DESCRIPTION OF THE DRAWINGS

FIG. 2 is a cross-sectional view of a fork damping cartridge.

FIG. 3 is a cross-sectional view of a fork damping cartridge.

FIG. 10 is a cross-sectional view of a damping cartridge, in accordance with embodiments of the present technology.

FIG. 11 is a cross-sectional view of a damping cartridge, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The discussion will begin with a brief overview of a vehicle wheel suspension. The discussion will then focus on embodiments of the present technology for a self-regulating suspension that provides for damping assemblies arranged in parallel within the vehicle suspension, thereby providing a greater traveling area for piston movement.

In general, vehicle wheel suspensions includes a damping mechanism for dissipating energy (inertial wheel movement induced by disparities in the terrain over which the vehicle travels) and a spring mechanism for storing energy to rebound a compressed suspension to an uncompressed state and to provide additional resistance to compression. Damping assemblies convert wheel movement into heat primarily by means of fluid friction in a dashpot type device. Spring mechanisms may take many forms including, coiled springs, elastomer bumpers, compressible fluid (e.g. gas, silicone oil), suitable combinations thereof or other suitable energy storage mechanisms.

Figure 1:
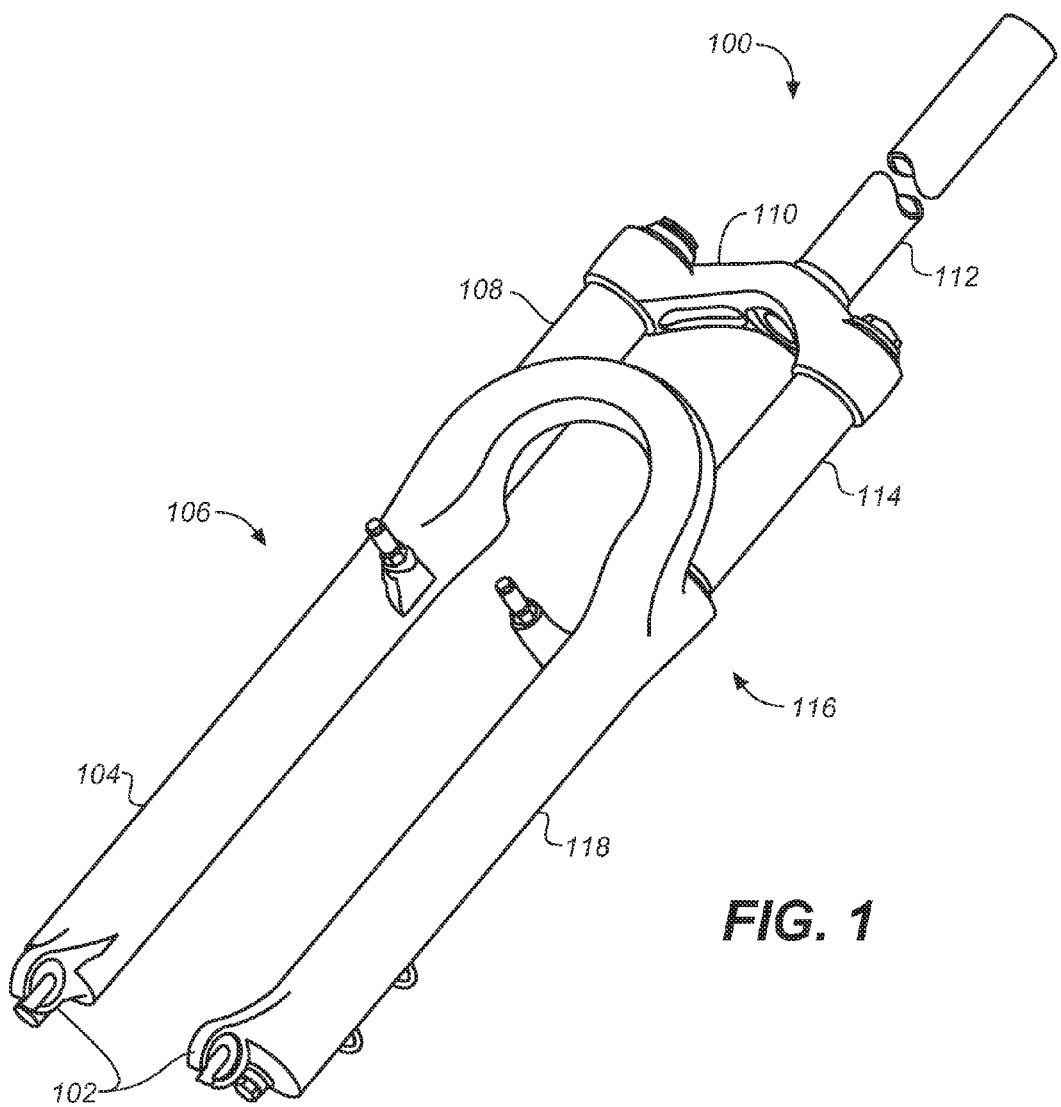
FIG. 1 is a perspective view of a fork.

Vehicles having a single front wheel, such as for example motorcycles and bicycles, often have front suspension assemblies in the form of a "fork" 100 as shown in FIG. 1. FIG. 1 is a perspective view of a type of fork 100. The fork 100 includes lower leg tubes 104 and 118 having upper leg tubes 108 and 114 telescopically engaged respectively therewith. The crown 110 holds the telescopic fork legs in spaced relation to the steering tube 112. The drop outs 102 accommodate the axle of a front bicycle wheel. The fork 100 shown includes right leg 106 and left leg 116, The fork 100 is similar to suspension disclosed in U.S. Pat. No. 7,163,222 which patent is incorporated herein, in its entirety, by reference.

FIGS. 2 and 3 show a cross-sectional view of an exemplary fork damping cartridge, 200 and 300, respectively, that includes the internal workings of at least one leg of a bicycle fork (or motorcycle fork). Although the damping cartridge 200 and 300 may function inside a single legged fork or shock absorber, the damping cartridge 200 and 300 may also be installed inside one or more telescoping legs of the fork 400 of FIG. 4 (a two-legged fork 402).

The top cap 206 includes male threads and an outer diameter o-ring seal. The top cap 206 is threaded into sealing engagement with an inner diameter of an upper leg tube (that extends through a crown, both not shown). The top cap 206 anchors the upper end of the cartridge axially to the upper end of the upper leg tube. The lower end of the cartridge includes a shaft 310 and a nut assembly 312 threaded onto the shaft 310. The shaft 310 extends through a hole in the bottom of a lower leg tube that the cartridge is substantially inside a combination of the lower leg tube and an upper leg tube telescopically engaged therewith. The nut assembly 312 is threaded onto the shaft 310 from outside the lower leg tube and the cartridge is thereby anchored axially to the bottom of the lower leg tube.

Referring still to FIGS. 2 and 3, the top cap 206 is connected to the piston rod 212, which in turn is connected to the piston assembly 202. The top cap 206 has an adjuster knob 208, which is connected to an adjuster plug 210. The adjuster plug 210 axially abuts an adjustment shaft 214 which in turn axially abuts a needle body 216. The needle body 216 includes the needle 218 which is disposed in variable axial relation within the orifice 220 of the piston assembly 202. The nut assembly 312 is connected to the shaft 310, which, through the lower damper 308 internal parts, is connected to the lower damper body 304, which is in turn connected to the damper body 306. Although the adjuster knob 208, adjuster plug 210, adjustment shaft 214, needle body 216 and needle 218 are axially movable relative to the top cap 206, the piston rod 212, the piston assembly 202 and the orifice 220, all of these move together axially in telescopic relation to the damper body 306.

During operation, the damper leg of the fork is subject to compression and rebound loads. The compression is induced by disparities in the terrain being traversed by a vehicle equipped with the fork. The rebound is induced by a spring (e.g., gas spring, mechanical spring, coil [not shown]), preferably located in another leg of the fork, which stores energy during compression of the fork and then releases that energy when the disparity is passed. The energy is released in urging the suspension unit to elongate axially following the axial compression during which the energy is stored. The top cap 206 and its connected parts (as disclosed herein) move with the upper leg tube during compression and rebound and the nut assembly 312 and its connected parts (as disclosed herein) move with the lower leg tube.

Movement of the upper leg tube relative to the lower leg tube causes the piston assembly 202 to move axially within the damper body 306. During a compression stroke, the piston assembly 202 moves downward in the damper body 306 and thereby reduces the volume of the compression chamber. As fluid is displaced from the compression chamber, some of it flows through passages and deflects from the one way shim stack valve to enter the rebound chamber 204. Some of the displaced fluid flows through the orifice 220 and into the lower damper 308. The resistance to movement of the fluid from the compression chamber, through the passages (and shim valve on piston) and the orifice 220 provide compression damping for the suspension unit in which the damper cartridge is included.

Referring still to FIGS. 2 and 3, during a rebound stroke, the piston assembly 202 moves upward in the damper body 306 and thereby increases the volume of the compression chamber. As fluid is displaced from the rebound chamber 204, it flows through apertures and into an annular volume. It then flows past the needle 218, through channels and the orifice 220 to enter the compression chamber. Also, the previously displaced fluid flows through the orifice 220 from the lower damper 308 and back into the compression chamber. The resistance to movement of the fluid from the rebound chamber 204, through the channels and the orifice 220 provide rebound damping for the suspension unit in which the damper cartridge is included.

Referring again to FIGS. 2 and 3, an alternative to the internal floating piston is an outer flexible tubing that is located within the lower damper body 304 and provides a compensation chamber for the volume of the shaft 310 as it enters the fluid reservoir 222 during compression. Another term used for the fluid reservoir is a "compressible chamber". The outer flexible tube 302 includes an elastic material or structure, for example an elastomeric toroid or semi-toroid or a metallic or plastic bellows or any other suitable structure or material. An interior of the outer flexible tube 302 is charged with a compressible fluid at an initial pressure. As the shaft 310 enters the compression chamber during compression, fluid flows from the compression chamber into the lower damper body 304 and the volume of the outer flexible tube 302 is reduced correspondingly as the gas within the outer flexible tube 302 is compressed. Such gas compression correspondingly raises the ambient pressure within the compression chamber and rebound chamber 204.

Figure 5:
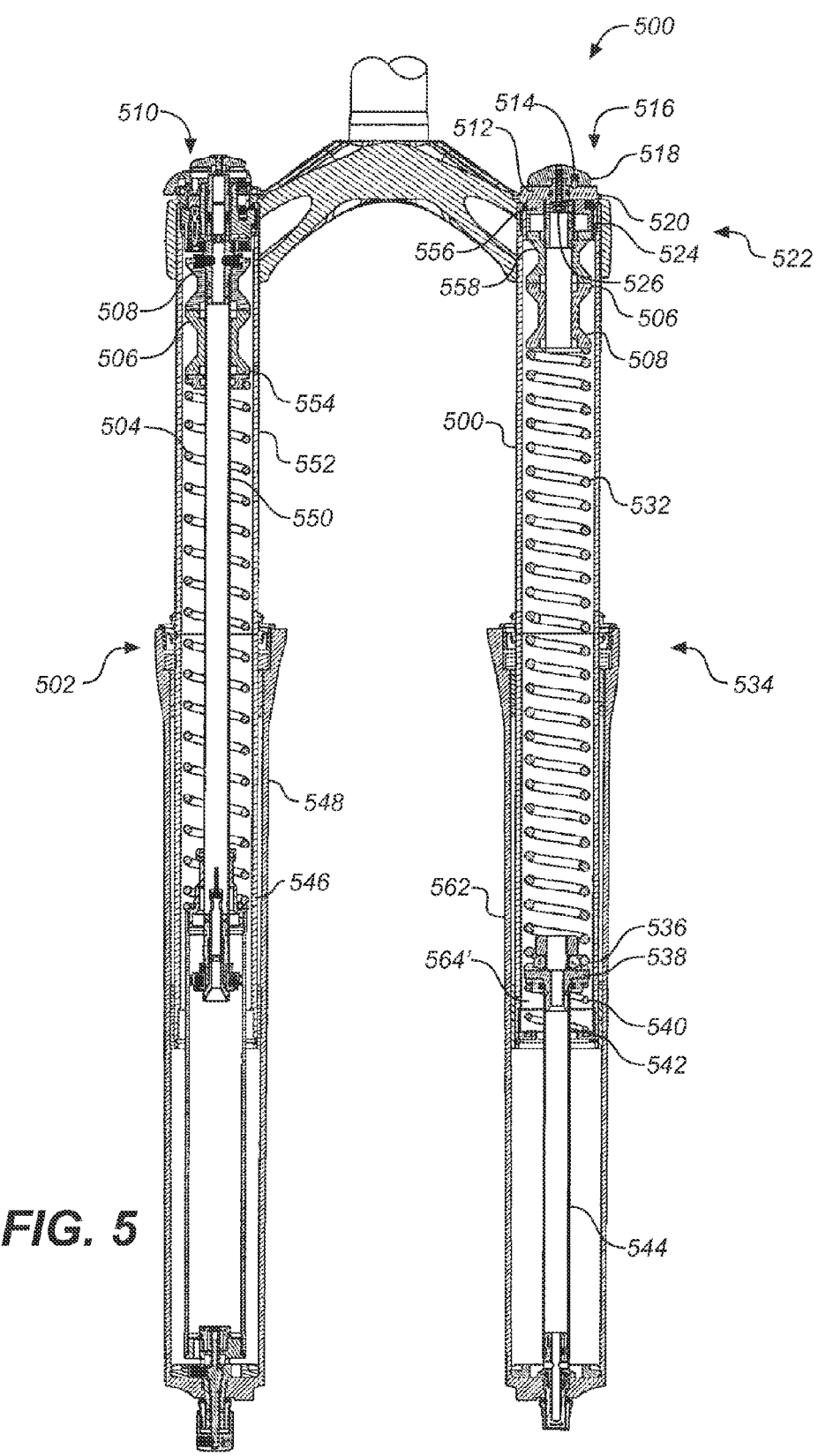
FIG. 5 is a cross-sectional view of a fork having a coil-sprung embodiment.
Figure 6:
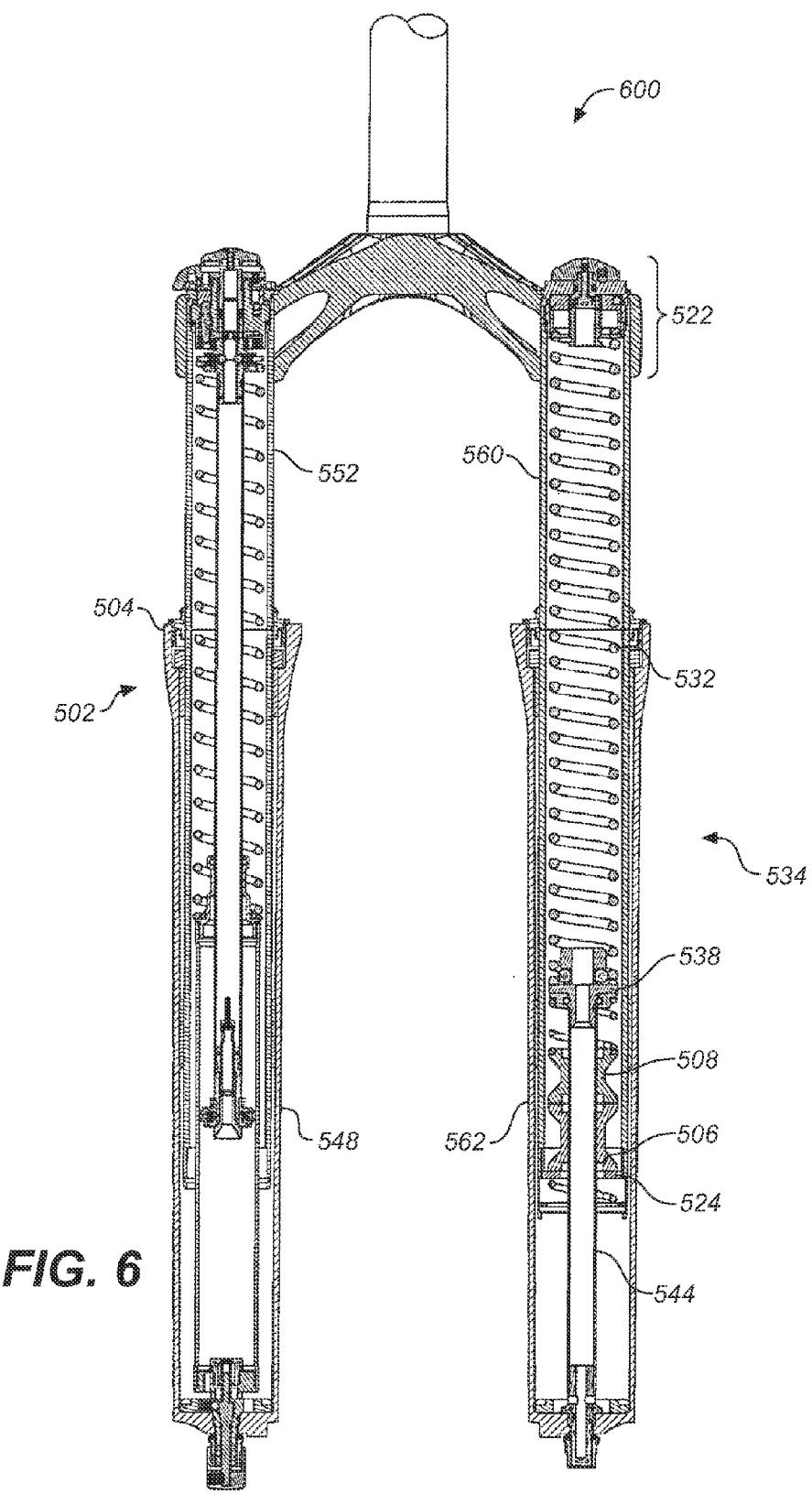
FIG. 6 is a cross-sectional view of a fork having a coil-sprung embodiment.

FIGS. 5 and 6 show embodiments of a suspension that may be adapted for use with the systems and mechanisms described herein. FIGS. 5 and 6 illustrate a coil-sprung embodiment of the two legged fork 100 of FIG. 1, indicated generally by reference characters 500 and 600 respectively.

The forks, 500 and 600, coil-sprung fork embodiments, utilize a pair of positive coil springs to provide an expansion force on the fork. A first spring 504 is located in the right fork leg, while a second spring 532 is located in the left leg 534. An air spring arrangement may be used in lieu of or in conjunction with a coiled spring. With a coil spring, first spring 504, second spring 532 located in each of the fork legs, right leg 502, left leg 534, respectively, the expansion force on the fork 500, 600 is substantially balanced between the fork legs, right leg 502, left leg 534. This enhances the coaxial telescopic motion of the upper legs, upper leg tube 552 and upper leg tube 560 relative to the lower leg tubes 548, lower leg tube 548 and 562 during compression and rebound for smooth motion with reduced binding.

The first spring 504 is positioned in the right leg 502 between the damper cap assembly 510 and the cartridge tube cap 546. A pair of spacers, including a first spacer 508 and a second spacer 506, are interposed between the damper cap assembly 510 and the first spring 504. In one embodiment the spacers, first spacer 508 and second spacer 506 are substantially C-shaped so that they may be easily removed from the damper shaft 550 in a radial direction. Optionally, the spacers, first spacer 508 and second spacer 506, are configured to engage the damper shaft 550 in a snap fit attachment.

An upper spring guide 554 is positioned between the first spring 504 and the spacer immediately adjacent the first spring 504 (second spacer 506 in the illustrated embodiment) to assist in keeping the first spring 504 concentric with the damper shaft 550. The cartridge tube cap 546 functions as an upper spring guide 554 for the lower end of the first spring 504. However, a separate spring guide 554 member may also be provided.

A second spring 532 is positioned in the left leg 534 between the spring cap assembly 522 and the upper spring stop 542. A first spacer 508 and a second spacer 506 are positioned between the spring cap assembly 522 and the second spring 532. In one embodiment, the first and second spacers 508 and 506, respectively, are substantially identical to the spacers described above in relation to the first spring 504.

A preload adjuster assembly 516 is provided to allow adjustment of the preload on the second spring 532. The preload adjuster assembly 516 generally comprises an adjuster cap 512, an adjuster shaft 558, a barrel 556 and an adjuster knob 518. The adjuster cap 512 is sealingly engaged with upper open end of the upper leg tube 560. The adjuster cap 512 includes a central aperture which allows the adjuster shaft 558 to pass through while in a sealed arrangement. The adjuster knob 518 is fixed to the adjuster shaft 558 by a fastener 526 such that rotation of the adjuster knob 518 results in the rotation of the adjuster shaft 558. A ball detent assembly 514, substantially similar to those described above, may be provided between the adjuster cap 512 and the adjuster knob 518 to define a plurality of preload adjustment positions.

The barrel 556 is threadably engaged with the adjuster shaft 558 and engages the second spacer. In addition, the barrel 556 includes a ball pocket for holding a ball bearing 520, which rides within an axial groove 524 defined by the adjuster cap 512. This arrangement prevents the barrel 556 from rotating relative to the adjuster cap 512. Accordingly, rotation of the adjuster shaft 558, via the adjuster knob 518, results in translation of the barrel 556 relative to the adjuster cap 512. A change in the axial position of the barrel 556 alters the preload force on the second spring 532.

The upper spring stop 542 is attached (e.g. roll-crimped) to a plunger rod 544 which extends upward from the closed end of the lower leg tubes 548 and 562. The upper spring stop 542 includes an O-ring 536 which serves as an upper spring guide 554 for the lower end of the second spring 532. The O-ring 536 is preferred because it's compressibility allows a single size of O-ring to accommodate a number of different spring inner diameters. The inner diameter of a spring may vary with different spring rates, therefore, the O-ring 536 allows a number of first and second springs 504 and 532, respectively, having varying spring rates to be used with fork. A negative spring chamber 564 is defined between the upper spring stop 542 and the lower spring stop 542. In one embodiment a single negative spring 540 is provided, rather than the dual negative coil spring arrangement of previous embodiments.

Figure 4:
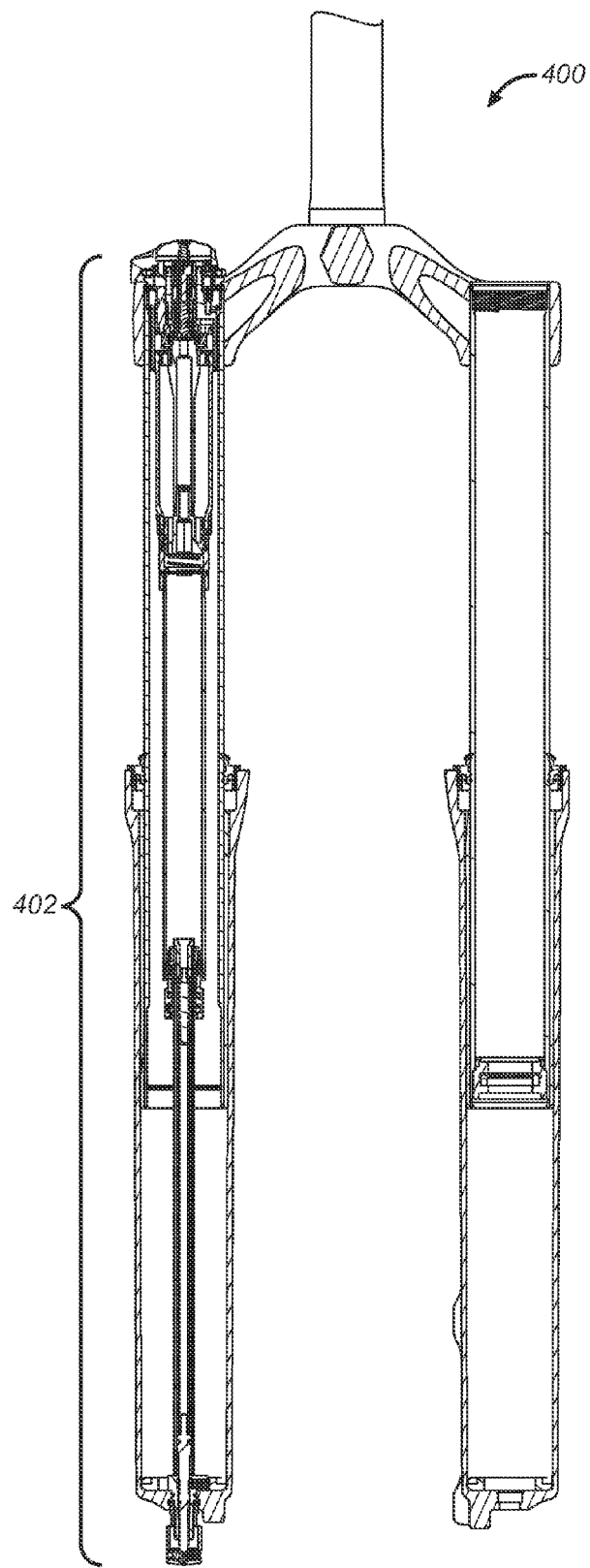
FIG. 4 is a cross-sectional view of one telescoping leg of a fork.

The forks 500 and 600 of FIGS. 5 and 6, respectively, are capable of being adjusted for varying amounts of travel, or total distance between it's fully compressed and fully extended positions. With reference to FIG. 4, the fork therein has been configured to have less travel than the fork as configured in FIG. 3. To accomplish this, the first and second spacers 508 and 506, respectively, of the left leg 534 were moved from their position between the upper end of the second spring 532 and the spring cap assembly 522 to a position below the plunger rod 544. Specifically, the upper spring guide is slid downward on the plunger rod 544 and the first and second spacers 508 and 506, respectively, are positioned between the upper spring guide and the upper spring stop 542. This lowers the upper leg tubes 552 and 560, relative to the lower leg tubes 548 and 562, and shortens the travel of the fork by the combined length of the first and second spacers 508 and 506, respectively. In order to accommodate the shorter travel configuration without altering the preload on the first spring 504, the spacers, (FIG. 5) are removed from the right leg 502.

In one embodiment, the first spacer 508 is approximately 20 mm in length and the second spacer 506 is approximately 25 mm in length. The travel for the fork as configured in FIG. 5 is approximately 125 mm. As configured in FIG. 4, the travel is reduced to 80 mm. Optionally, only one of the first and second spacers 508 and 506, respectively, may be positioned below the upper spring stop 542 while the other spacer remains positioned above the upper stop. With this configuration, the fork travel would be shortened by the length of the spacer positioned below the upper spring stop 542, either 20 mm or 25 mm. The corresponding first and second spacers 508 and 506, respectively, may be removed from the right leg 502, to maintain the desired preload on the first spring 504, as described above. Additionally, varying spacer configurations may be used. For example, the first and second spacers 508 and 506, respectively, may be replaced by a single spacer. Also, spacers of other lengths may be used.

Figure 7:
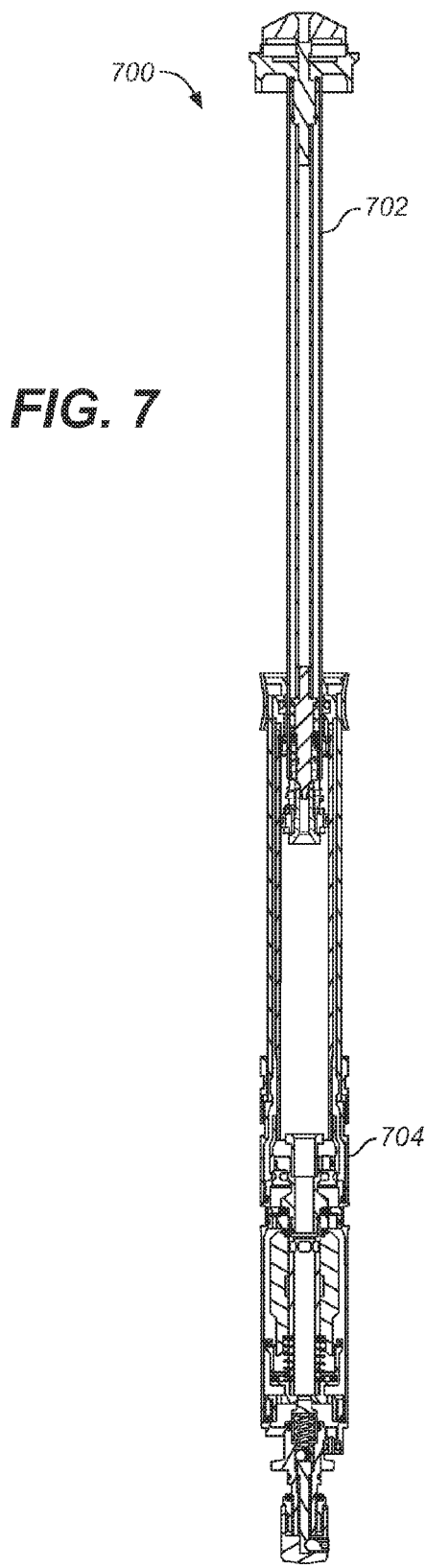
FIG. 7 is a cross-sectional of a leg tube of a fork.
Figure 8:
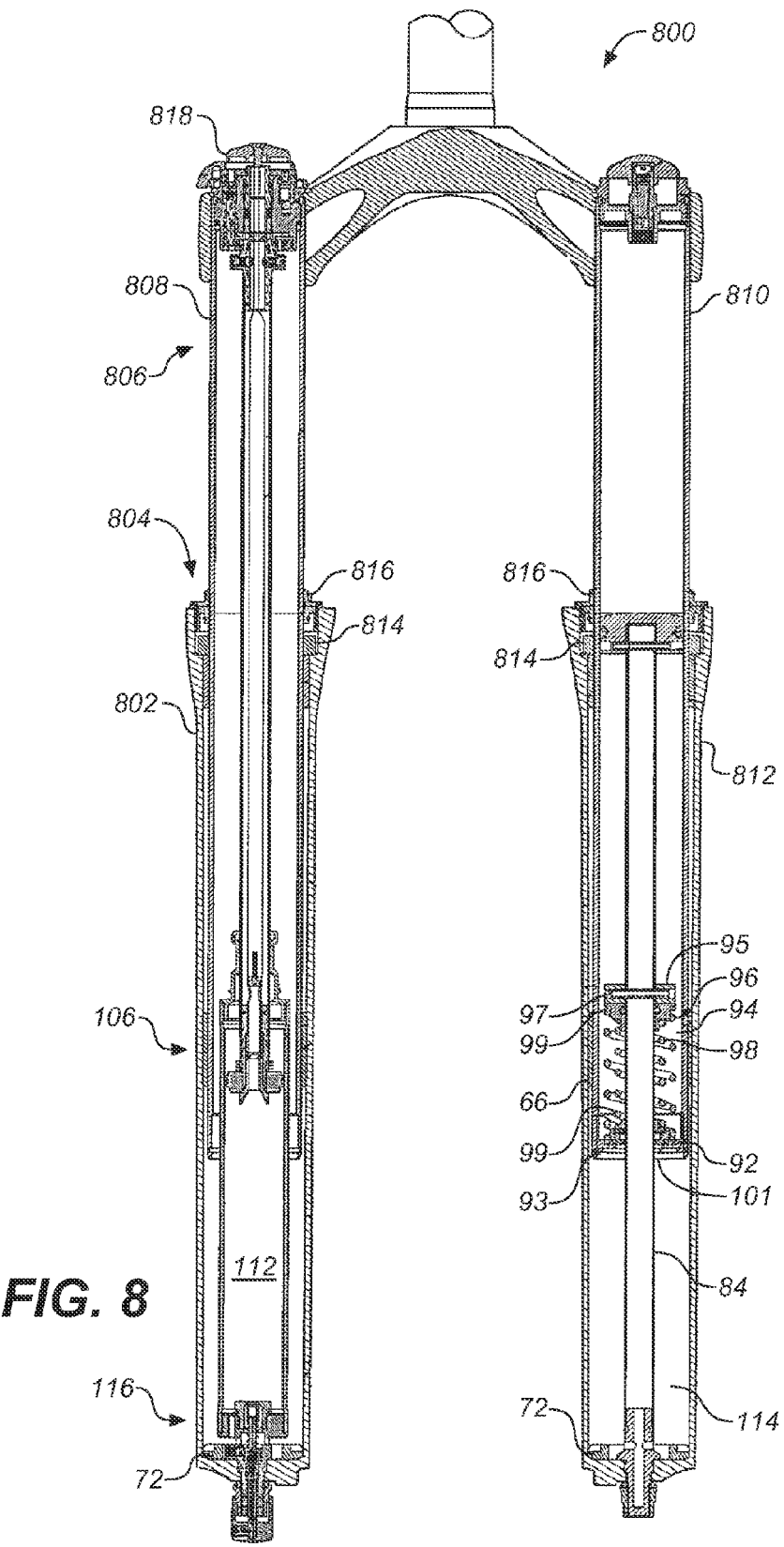
FIG. 8 is a cross-sectional view of a damping assembly with the leg tube of FIG. 7.

FIGS. 7 and 8 show cross-sectional views of one leg of a fork 700 and a damping assembly 800, respectively, in embodiments of the present technology. In relevant detail, as shown in FIG. 8, are lower left and right leg tubes 802 and 812, respectively, having upper left and right leg tubes 808 and 810, respectively, telescopically engaged respectively therewith. In the asymmetric fork embodiment of FIG. 8, right leg 806 comprises a damping assembly while left leg comprises a spring assembly. Optionally, one or each (both) legs may comprise both a damping and spring assembly.

FIG. 8 shows other components of a fork 800 that are not described in detail, but are depicted nonetheless for contextual purposes. These components are damper cap assembly 818, and damper assembly 804 of right leg. Each for leg comprises a seal and wiper assembly, located at the entrance or upper opening of each lower left and right leg tube, 802 and 812, respectively, to seal the telescopic leg and to keep debris out of the telescopic leg. The seal assembly seals against an outer surface of the upper left and right leg tubes 808 and 810, respectively, as it moves telescopically relative to the opening. In the shown embodiment, the seal assembly comprises wiper seal 816 and foam ring 814.

FIG. 7 shows a damper interoperable with a piston rod 702 within a leg of a suspension fork, according to one embodiment of the present technology. Referring to FIGS. 7 and 8, the upper left leg tube 808 telescopes in and out of the lower left leg tube 802 in response to bumps or depressions that are encountered by a wheel attached to the drop out (from FIG. 1) of the lower left leg tube 802. Such forces are transmitted to the piston rod 702 and lower cartridge 704 since the piston rod 702 is fixed relative to the upper left leg tube and the lower cartridge 704 is fixed relative to the lower left leg tube 802 that results in a compression force (telescopes in) or tensile force (telescopes out) respectively between the piston rod 702 and the lower cartridge 704.

Currently, damping assemblies are arranged linearly, and therefore utilize space within a fork leg that would otherwise be used to accommodate a piston traveling within a compression chamber. Embodiments of the present technology arrange damping assemblies in parallel with each other, thereby opening up space with a fluid reservoir for receiving a piston traveling there through.

In one embodiment, the isolated suspension location is positioned along the outer edge of a cylinder (comprising a compression chamber) within a fork leg, and includes an outer wall made of flexible tubing that is designed to expand outward in response to an entry of damping fluid into the isolated suspension location. Thus, for example, when a lower leg telescopically receives an upper leg during compression, the piston of the upper leg moves into a compression chamber (hereinafter, "fluid reservoir") of the lower leg that is filled with damping fluid. The movement of this piston therein causes the damping fluid to move along a fluid flow circuit from the fluid reservoir and through an inertia valve. If the pressure on the damping fluid caused by the compression exceeds a predetermined threshold, the inertia valve is caused to open such that the damping fluid is able to travel to an isolated suspension location positioned along the outer edge of the cylinder.

Once in the isolated suspension location, the damping fluid accumulates and causes the flexible tubing enclosing a portion of the isolated suspension location to expand outwards while at the same time providing resistance and thus a damping effect. A flow regulator (e.g., a one-way shim stack valve is located between the inertia valve and the fluid reservoir). This flow regulator applies another damping influence on the damping fluid flowing through the fluid flow circuit towards the isolated suspension location. Further, this flow regulator is adjustable, thereby enabling the adjustment of a damping rate applied by the flow regulator onto the damping fluid.

In one embodiment, when the inertia valve is in a "lock-out" state, telescopically engaging movement between the two fork legs is inhibited. However, a blow-off valve that is positioned in series with the inertia valve and with the flow regulator operates to displace the damping fluid to the isolated suspension location when a predetermined threshold is reached or exceeded.

For example, when the damping fluid pressure in the fluid reservoir is above a predetermined threshold, a piston is forced away from a piston seat and allows damping fluid to flow through an inertia valve opening and through radial ports in the inertia valve body and into the isolated suspension location, thus lowering the pressure within the compression chamber.

However, when the inertia valve is in a lock-out state, the cylinder of the lower fork leg is at a closed position, and the flow of hydraulic fluid is prevented through the low, mid and high-speed compression circuits. Thus, the fork is also in a lock-out state, where substantially no relative motion is permitted between the upper leg tubes and the lower leg tubes and. This prevents rider pedal energy from being absorbed by the fork, thereby allowing such energy to instead promote forward motion of the bicycle.

If a large bump is encountered, such that the pressure within the fluid reservoir rises above the threshold necessary to open the blow-off valve, the blow-off valve operates to allow fluid flow from the fluid reservoir to the isolated suspension location. This prevents damage to the various seals of the fork and prevents the entire force of the bump from being transferred to the rider.

Thus, embodiments of the present technology provide a self-regulating suspension system that includes an inertia valve and blow-off valve positioned in parallel with each other and a flow regulator positioned in series with each of the inertia valve and the blow-off valve (and the fluid flow associated with the valves). This unique design enables more travel room in the compression chambers for movement of a piston, thereby providing a more consistent damping rate response to movement of an upper leg tube in relation to the lower leg tube.

The following discussion will begin with a description of the structure of the components of the present technology. This discussion will then be followed by a description of the components in operation.

Structure

Figure 9A:
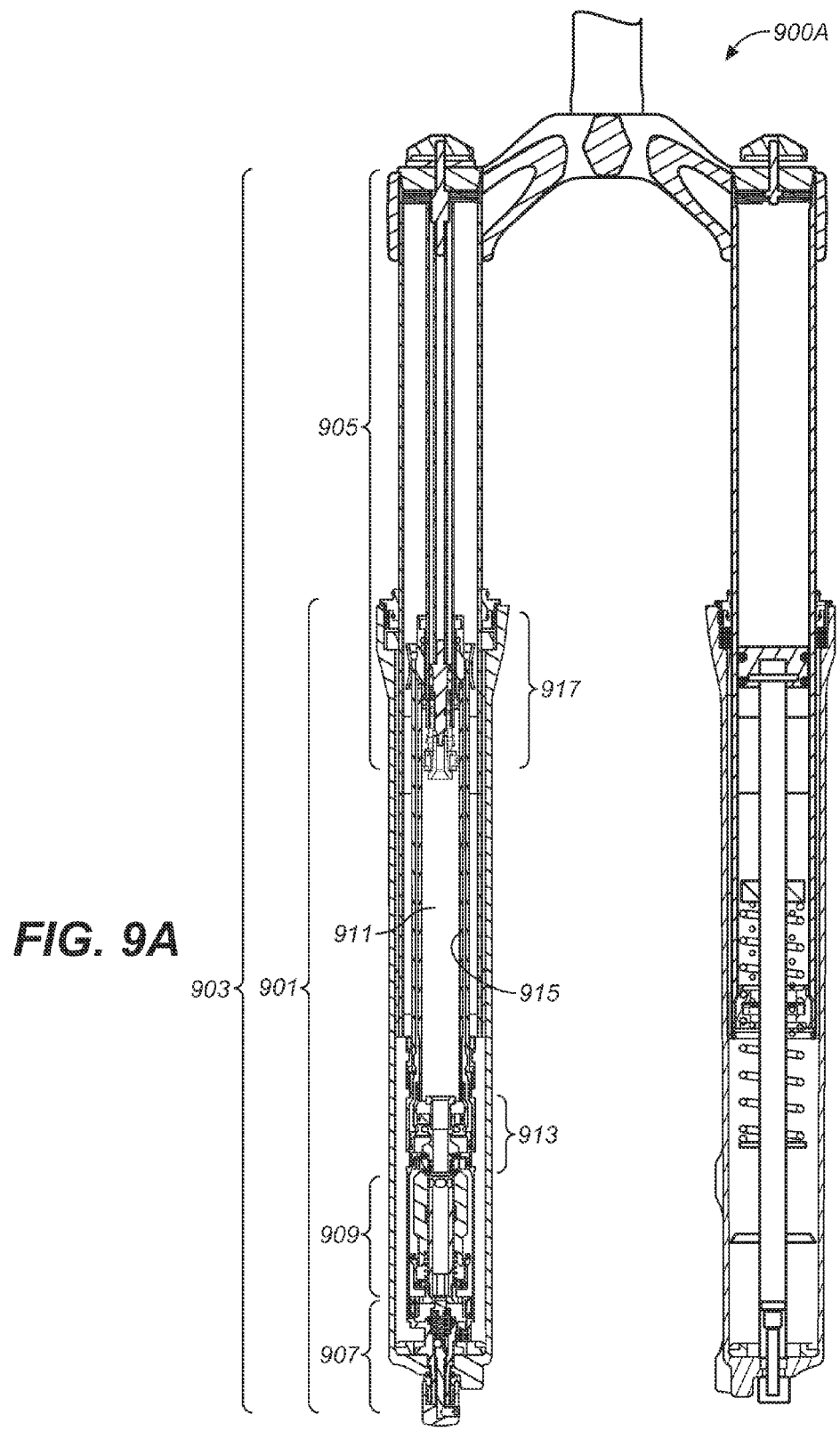
FIG. 9A is a cross-sectional view of a fork, in accordance with embodiments of the present technology.

FIG. 9A shows a cross-sectional view of a fork 900A, in accordance with embodiments of the present technology. FIG. 9A shows the right leg 903, including the upper leg tube 905 telescopically engaged with the lower leg tube 901. In embodiments, movable within the lower leg tube 901 is the damping piston assembly or "damping cartridge" 917. The lower leg tube 901, in embodiments, includes the cylinder 915 enclosing the fluid reservoir 911 and positioned above the damping valve assembly or "lower cartridge" 913. Further, the inertia valve assembly 909 and the blow-off valve assembly 907 are positioned below the lower cartridge 913.

Figure 9B:
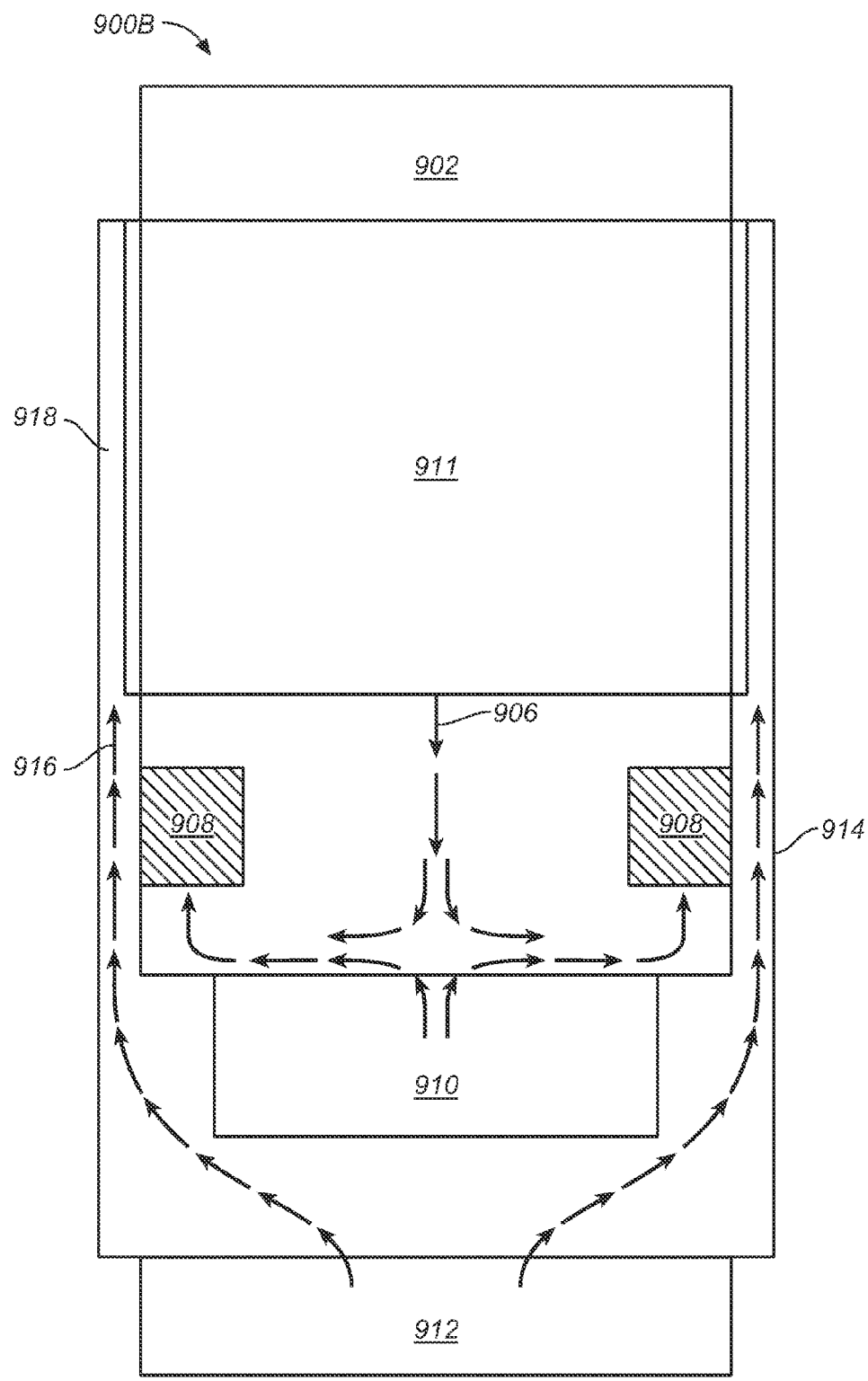
FIG. 9B is a block diagram of a self-regulating suspension, in accordance with embodiments of the present technology.

FIG. 9B is a block diagram of a self-regulating suspension 900B in accordance with embodiments of the present technology. In one embodiment, a self-regulating suspension includes a first suspension member (e.g., upper leg tube 905), a second suspension member (e.g., lower leg tube 901), a fluid reservoir (e.g., compression chamber) 911 and a fluid flow circuit 922. In one embodiment, the first suspension member 902 is axially movable relative to the second suspension member 914.

Figure 9C:
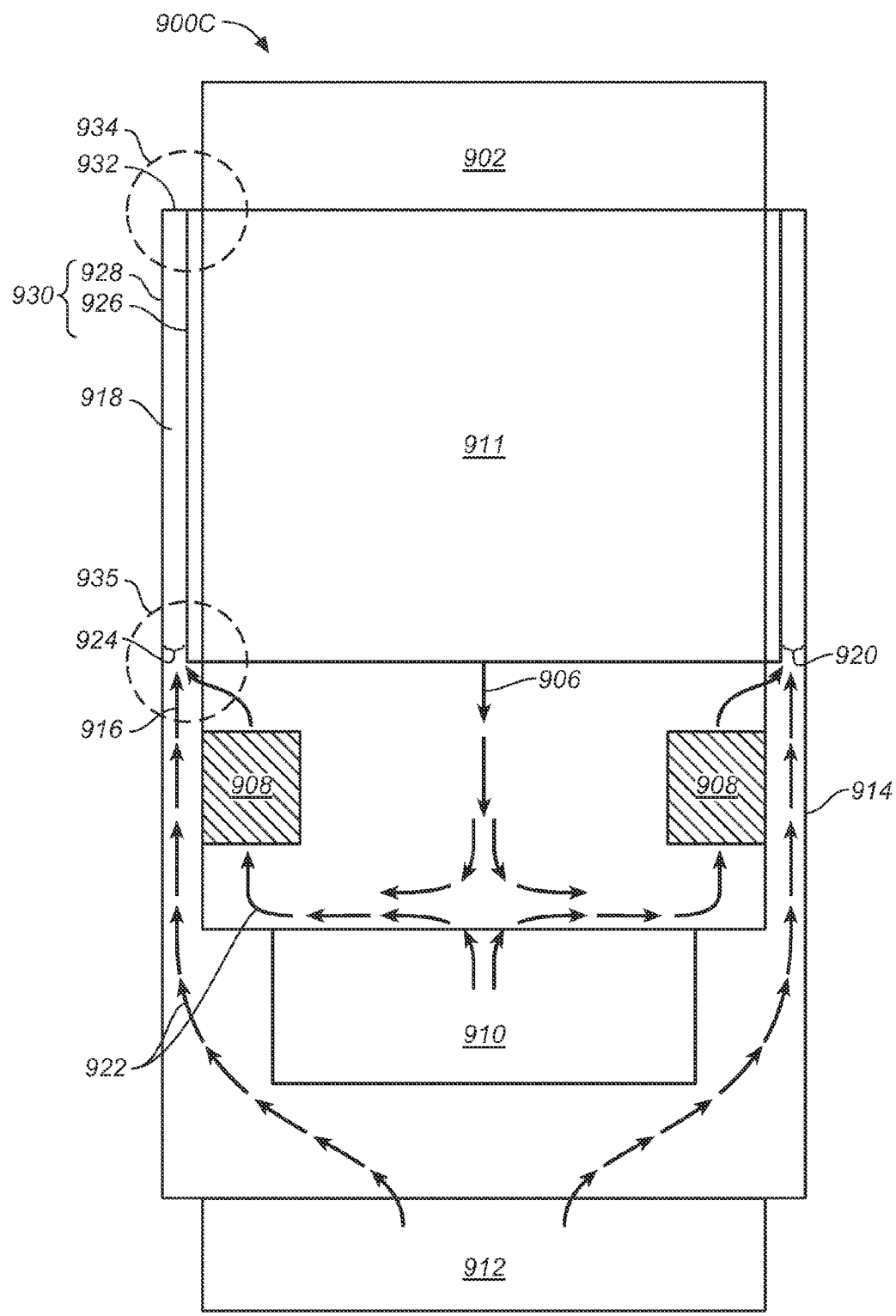
FIG. 9C is a block diagram of a self-regulating suspension, in accordance with embodiments of the present technology.

In another embodiment, the fluid reservoir (e.g., compression chamber) 911 has a volume that is variable in response to a relative movement between the first and the second suspension members. In one embodiment, the fluid flow circuit 922 has a first end 906 in fluidic communication with the fluid reservoir 911 and a second end 916 in fluidic communication with an isolated suspension location (e.g., defined by the interior of the annular elastic bladder [e.g., flexible tubing 928 of FIG. 9C] and the exterior of the compression chamber tube [e.g., cylinder 915 of FIG. 9A]) 918. In one embodiment, the fluid flow circuit 922 comprises a first valve (e.g., inertia valve) 910, a second valve (e.g., damping valve [flow regulator]) 908 and a third valve 912, wherein the first valve 910 and third valve 912 are in parallel and the second valve 908 is in series with each of the first and third valves 910 and 912, respectively.

Of note, in one embodiment, the first valve 910 is part of the inertia valve assembly 909, as shown in FIG. 9A. In one embodiment, the second valve 908 is a flow regulator 956 (shown in FIG. 9D). In one embodiment, a portion of the flow regulator 956 includes a one way shim stack valve. Moreover, in another embodiment, the third valve 912 is part of the blow off valve assembly 907, as shown in FIG. 9A.

In one embodiment, the isolated suspension location 918 includes an inlet 924 in fluidic communication with the second end (e.g., the outlet of the second valve [damping valve]) 916 of the fluid flow circuit 922, an end barrier 932 and an annular enclosing wall 930 that defines an isolated suspension location 918 between the inlet 924 and the end barrier 932. In one embodiment, the annular enclosing wall 930 includes an outer surface 926 of a cylinder 915, a flexible tubing 928, a first compression region 934 and a second compression region 935, the compression regions 934 and 935 including hardware fro sealing and retaining each respective end of the flexible tubing 928.

In one embodiment, the first compression region 934 is configured for sealingly compressing a first end of the flexible tubing 928 against a first end of the of the cylinder 915. In another embodiment, the second compression region 935 includes the inlet 924 and is configured for retainably compressing a second end of the flexible tubing 928 against a second end of the outer surface 926 of the cylinder 915.

Figure 9D:
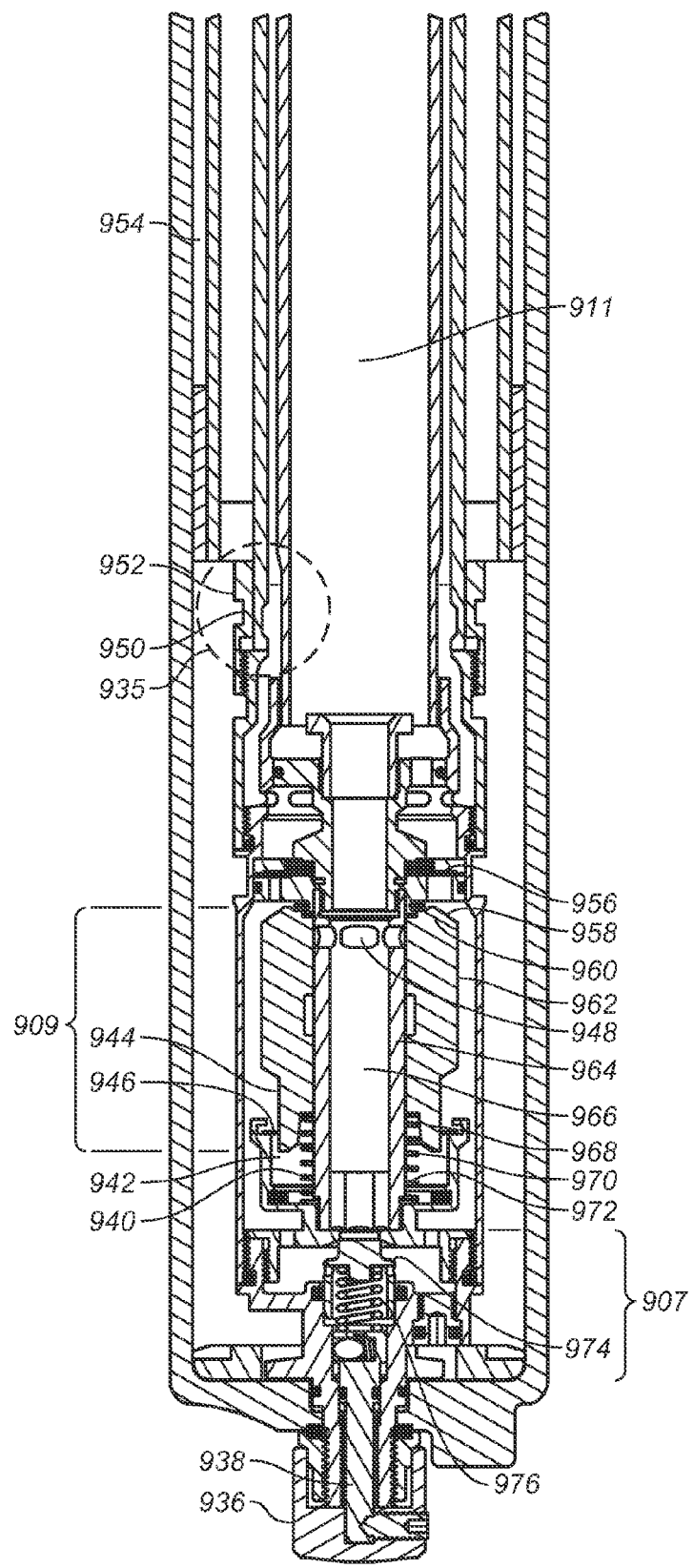
FIG. 9D is a cross-sectional view of a portion of the right leg 903, including a cylinder, a lower cartridge and a inertia valve, in accordance with embodiments of the present technology.

FIG. 9D is a cross-sectional view of a portion of the right leg 903, in accordance with embodiments of the present technology. More specifically, FIG. 9D shows embodiments of the previously schematically described FIGS. 9B and 9C, including a portion of the cylinder, the lower cartridge, the inertia valve and the blow-off valve, according to embodiments.

In one embodiment, the first compression region 934 includes a portion 982 of the first end of the flexible tubing 928, and a first seal ring 980 configured for sealingly compressing the portion 982 of the first end of the flexible tubing 928 against the first end of the outer surface of the cylinder 926, such that the first end of the flexible tubing 928 and the first end of the outer surface 926 of the cylinder 915 are sealingly squeezed shut. Further, in one embodiment, the portion 982 of the first end of the flexible tubing 928 includes an upset. In one embodiment, both ends of the flexible tubing 928 are constant wall with the flexible tubing 928 (i.e., no upsets).

In one embodiment, the second compression region 935 includes a portion 952 of the second end of the flexible tubing 928 and a second seal ring 950 configured for retainably compressing the portion 952 of the second end of the flexible tubing 928 against the second end of the outer surface 926 of the cylinder 926, such that the second end of the flexible tubing 928 and the second end of the outer surface of the cylinder 926 are squeezed partially together to retain a first 915 while remaining open to damping fluid flowing between the fluid flow circuit 922 and the isolated suspension location 918. In one embodiment, the portion 952 of the flexible tubing 928 includes an upset.

Figure 9E:
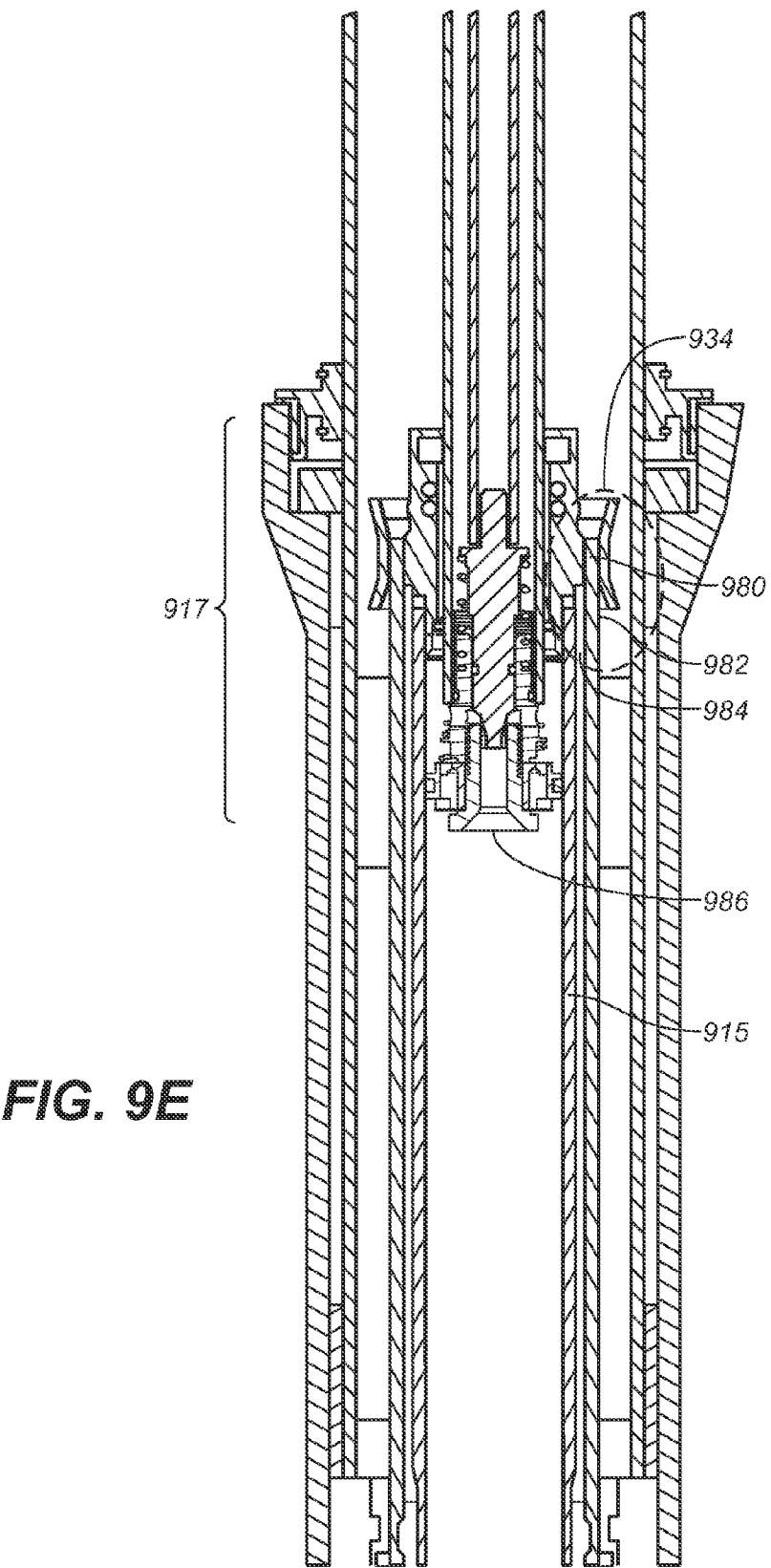
FIG. 9E is a cross-sectional view of a portion of the right leg 903, including a cylinder and a damping cartridge, in accordance with embodiments of the present technology.

FIG. 9E is a cross-sectional view of a portion of the right leg 903, in accordance with embodiments of the present technology. FIG. 9E shows a portion of the cylinder 915 and damping cartridge 917. In one embodiment, the flexible tubing 928 is configured for creating a fluid tight seal at each end of the flexible tubing 928. The outer flexible tube is upset and the upset end is captured by a seal ring (first and second seal rings 980 and 950, respectively). During installation, the seal ring is pressed into the inner diameter at an end of the outer flexible tubing 928 such that it straddles the upset. The end of the outer flexible tubing 928, with the seal ring installed is then slid axially into an inner diameter of a solid cylindrical housing, such as for example, the inner diameter of the annular partition 1602 (of FIG. 16). The annular partition 1602 and the seal ring are dimensioned such that the annular space formed between them is radially thinner than the thickness of the upset, thereby placing the elastic upset in a sealing squeeze (such as an o-ring mechanism would function).

In one embodiment, the bladder stock may be extruded from a suitable elastic material and then cut to an appropriate length. The length may then be upset by a secondary upsetting process (e.g. using heat and pressure). Optionally, the upsetting is not necessary and the seal ring and inner diameter of the annular partition 1602 are designed to squeeze, in sealing engagement, the mere thickness of the bladder stock where such squeeze is also sufficient to resist axially loading and "shrinkage" forces that may occur when the bladder is internally pressurized (to expand radially).

In one embodiment, the flexible tubing 928 includes extruded tube stock. In another embodiment, the flexible tubing 928 includes pulltruded tube stock. In one embodiment, the flexible tubing 928 may be designed, manufactured, and constructed as described herein and may include any suitable material. The outer flexible tubing 928 exhibits elastic characteristics. In the embodiments of FIGS. 9A-9E, the substantially tubular outer flexible tubing is sealingly captured at each end by a support structure 1002 and a pinch cap 1004. Each mechanism is described further herein. Some embodiments may include other features for further definition as disclosed in U.S. patent application Ser. No. 12/509,258, which application is incorporated herein, in its entirety by reference.

In one embodiment, the extruded or pulltruded tube stock is cut in segments to suitable length. Such manufacturing option may reduce costs per bladder and increase the bladder material and property options available.

In one embodiment, one of the first and second suspension members, 902 and 914, respectively, is an upper leg tube 905, and the other of the one of the first and second suspension members, 902 and 914, respectively, is a lower leg tube 901. The lower leg tube 901 is configured for telescopically receiving the upper leg tube 905 and is axially slidable relative thereto.

In one embodiment, the first valve 910 is an inertia valve including a movable inertia mass 962 and a shaft 964. In one embodiment, the shaft 964 comprises an interior hollow portion and an outer surface. The interior hollow portion is in fluidic communication with at least one flow passage intermediate a first and second end of the shaft 964. The at least one flow passage is selectively and at least partially obstructed by the movable inertia mass 962 to control a degree of fluid flow restriction from the fluid reservoir 911 to the isolated suspension location 918 depending on a position of the inertia mass.

For example, and referring now to embodiments of FIGS. 1-9E, when a bump is encountered by a wheel carried by the suspension and damper of FIG. 7, the suspension generally is moved upwardly (as indicated in FIG. 7). The inertia (i.e. tendency to remain at rest) of the inertia valve (of the inertia valve assembly 909) causes that inertia valve, due to its designed mass, to remain in space while a suspension member 902/914 generally moves in response to the impulse caused by the wheel impacting the bump. The result is that the inertia valve "moves" down relative to the shaft 964 (in fact the shaft 964 moves up), thereby fluid communicates through fluidic ports 948 with the axial flow paths 1202. With the inertia valve so open in response to the wheel encountering the bump therefore, fluid may flow from the fluid reservoir 911 and extension (hereinafter, "compression chamber 966"), through the fluidic ports 948, through axial flow paths 1202, and may exert fluid reservoir 911 and compression chamber pressure on the one way shim stack valve 956.

FIG. 10 shows a cross-sectional view of the damping cartridge 917, the cylinder 915 and the lower cartridge 913, in accordance with embodiments of the present technology. Referring now to FIG. 10, it is noted that the one way valve 1002 may include any suitable damping fluid control mechanism described herein or any suitable combination thereof. After the damping fluid has passed through the one way valve 1002, it flows through the path and annulus 1006 and into the isolated suspension location 918 (which may be viewed as a sort of annulus). The isolated suspension location 918 is formed as a volume between flexible tubing 298 (or "bladder") and an inner tube, or compression chamber wall 926 (or outer surface 926 of cylinder 915). The inner tube includes the tubular wall of the fluid reservoir 911. Of note, the fluid reservoir 911 is within a cylinder 915. In one embodiment, the isolated suspension location 918 and the fluid reservoir 911 wall are substantially concentric. The isolated suspension location 918 acts to accumulate displaced fluid reservoir 911 and compression chamber 966 fluids during compression of the suspension, and to supply refill fluid, to the fluid reservoir 911 and the compression chamber 966 during rebound.

FIG. 11 shows a cross-sectional view of the damping cartridge 917, the cylinder 915 and the lower cartridge 913, in accordance with embodiments of the present technology. The return or "rebound" flow sequence includes fluid flowing from the isolated suspension location 918, to the path and annulus 1006, where it then exerts a pressure against one way valve 1002. The one way shim stack valve 956 is biased closed by a spring 1104. When return flow pressure is sufficient, the one way valve 1002 is opened and the damping fluid flows through passage(s) 1008 and into the fluid reservoir 911 and the compression chamber 966. In such an embodiment, the inertia valve is bypassed during rebound. Of note, in one embodiment, the one way valve 1002 includes any of the mechanisms described herein in references to the one way shim stack valve 956 or combination thereof.

In one embodiment, the movable inertia mass 962 is configured for moving along the outer surface of the shaft 964 between a first position 970 and a second position 972. The first position 970 includes a location along the outer surface of the shaft 964 that at least partially restricts fluid flow through a flow passage. In one embodiment, a portion of the fluid bypasses flowing through a flow passage to flow from the fluid reservoir 911 to the isolated suspension location 918 as a piston rod 986 moves further into a second suspension member 914. The second position 972 includes a location along the outer surface of the shaft 964 that is providing less restriction to fluid flow through a flow passage, wherein less fluid bypasses flowing through a flow passage to flow from fluid reservoir 911 to the isolated suspension location 918 as the piston rod 986 moves further into a suspension member.

In one embodiment, the movable inertia mass 962 moves from the first position 970 towards the second position 972 when an upward acceleration imparted to at least a portion of the self-regulating suspension exceeds a predetermined acceleration threshold.

In one embodiment, the inertia valve includes a first plurality of protrusions 958 located on a first end 960 of the movable inertia mass 962. The first plurality of protrusions 958 is configured for impacting a first absorber when the inertia valve is opened. In another embodiment, the inertia valve further includes a second plurality of protrusions 942 located on a second end 944 of the movable inertia mass 962. The second plurality of protrusions 942 is configured for impacting a second absorber 1204 when the inertia valve is closed.

Figure 12:
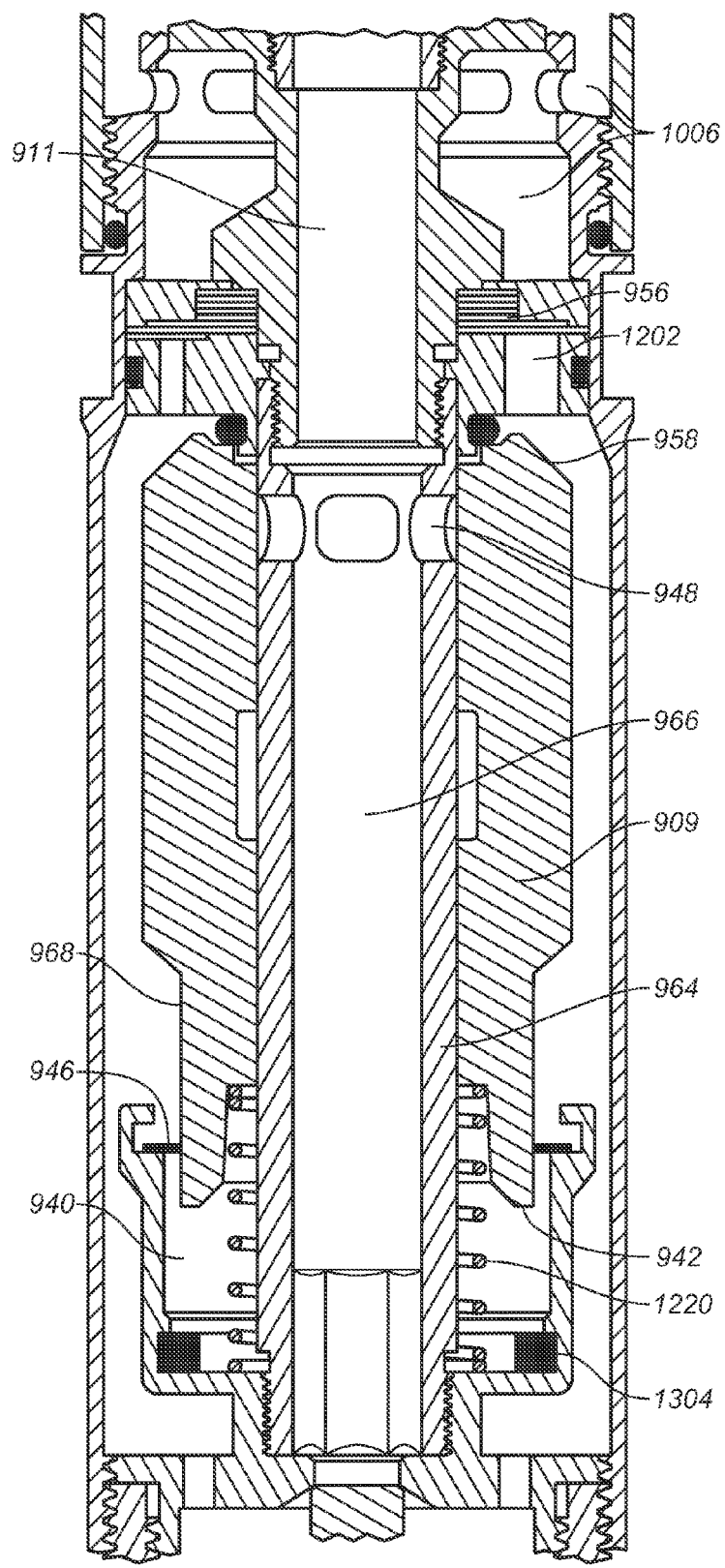
FIG. 12 is a cross-sectional view of a portion of a lower cartridge, an inertia valve and a portion of a blow-off valve, in accordance with embodiments of the present technology.

FIG. 12 shows a cross-sectional view of portion of a lower cartridge 913, an inertia valve and a portion of a blow-off valve, in accordance with embodiments of the present technology. In one embodiment, inertia valve comprises extension "feet" (that are not continuous circumferentially, thereby allowing free fluid flow there around) for impacting an elastomer or other suitably compliant absorber when the inertia valve is opened forcefully. In one embodiment, the extension feet include a first plurality of protrusions 958, as is described herein. In another embodiment, the extension feet include a second plurality of protrusions 942, as is described herein.

In one embodiment, the self-regulating suspension includes an adjustable time delay mechanism configured for delaying the inertia valve from returning to a closed position. In one embodiment, the adjustable time delay mechanism includes a fluid recess 940, a one-way delay valve washer 946 and an inertia valve delay neck 968. In one embodiment, the fluid recess 940 is configured for holding damping fluid. In one embodiment, the fluid recess 940 is in fluidic communication with the fluid flow circuit 922. For example and referring to FIG. 12, the time delay functions to hold the inertia valve open against spring 1220 for a predetermined period of time.

Various inertia valve and delay mechanisms are disclosed in U.S. Pat. Nos. 7,520,372, 7,506,884, 7,273,137, 7,128,102, 6,604,751, and 6,581,948, each of which is incorporated, in its entirety, herein by reference. Various inertia valve and delay mechanisms are disclosed in United States Published Patent Application numbers 2008/007017 A1, 2008/0053767 A1, and 2008/0053768 A1, each of which is incorporated, in its entirety, herein by reference. Another variety of inertia valve fork is disclosed in U.S. Pat. No. 6,105,987 which is incorporated, in its entirety, herein by reference.

In another embodiment, the one way delay valve washer 946 is configured for opening when a fluid pressure differential between the compression chamber 966 and the fluid recess 940 is below a predetermined threshold. In one embodiment, the inertia valve delay neck 968 is positioned at the second end 944 of the movable inertia mass 962. The inertia valve delay neck 968 is configured for being biased open by a spring 1220 for a predetermined period of time. The period of time is that which is chosen by a user or that which is preset by someone other than the user. In one embodiment, the predetermined period of time is translated to the adjustable time delay mechanism via rotation of a delay adjustment knob. For example, a delay mechanism knob may be turned, which turn changes the time in which the spring 1220 is being biased open.

In one embodiment, the self-regulating suspension further includes a knob assembly that is selectively rotatable. The knob assembly includes, in one embodiment, a damping valve adjustment knob 936 and a damping valve adjustment shaft 938. The damping valve adjustment knob 936 is configured for being rotated. The damping valve adjustment shaft 938 is configured for responding to rotational movement of the damping adjustment knob. In one embodiment, the responding includes moving axially in proportion to a thread helix and pushing or pulling on an adjustment shaft that is coupled with a needle valve 1304, thereby adjusting an interference of the needle valve 1304 within a damping orifice 976 that extends through a center of a damping piston 974. In one embodiment, during compression or extension of the self-regulating suspension, the damping piston 974 controls a flow of the damping fluid.

Figure 13:
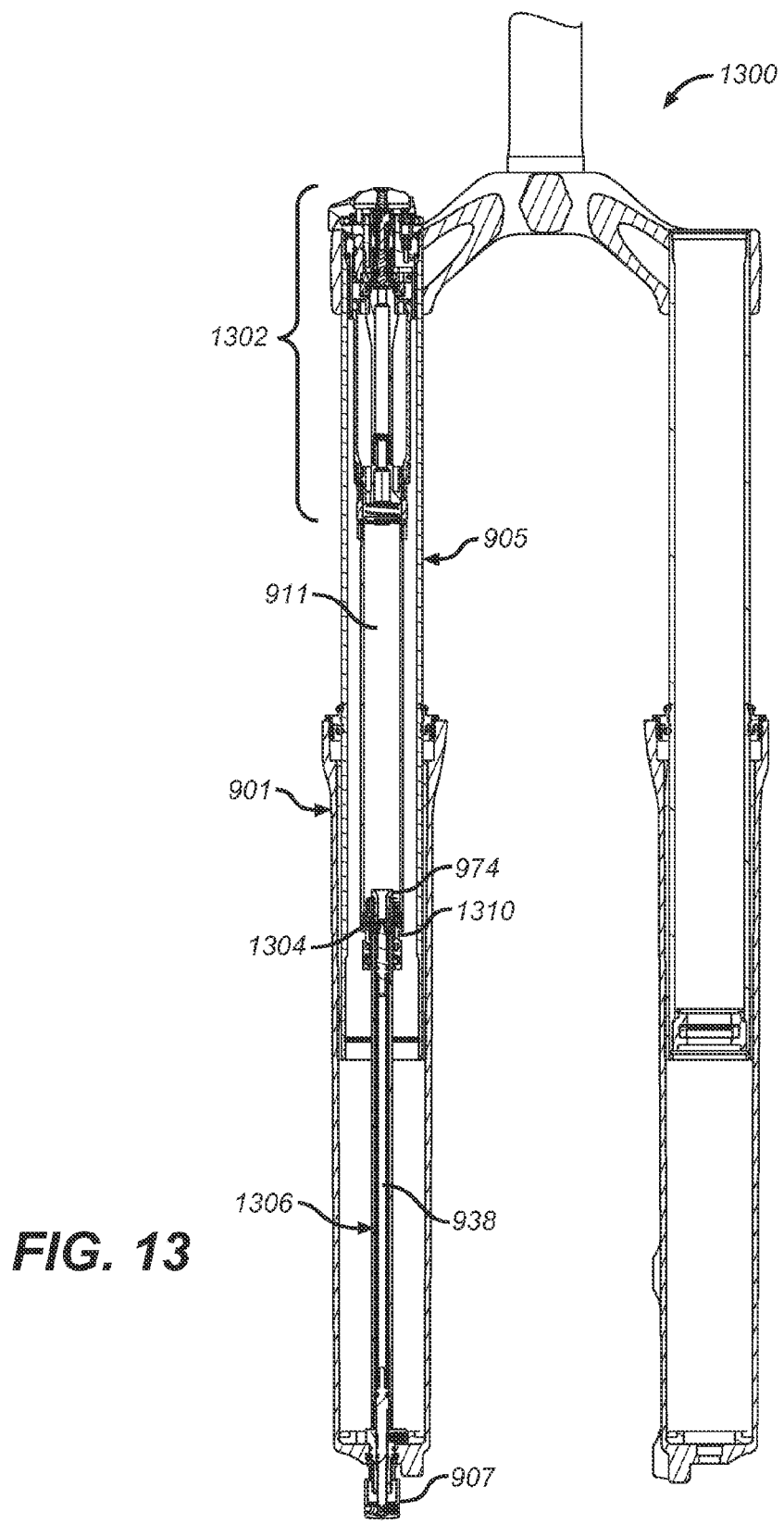
FIG. 13 is a cross-sectional view of a leg of a fork, in accordance with embodiments of the present technology.

FIG. 13 shows a cross-sectional view of a leg of a fork 1300, in accordance with embodiments of the present technology. For example, in one embodiment, as shown in FIG.

13, the boost valve pair is mounted in a control assembly 1302 of a fork 1300. The control assembly 1302 is shown in greater detail in FIGS. 14 and 15. Referring to FIG. 13, the fork 1300 includes an upper leg tube 905 telescopically received within a lower leg tube 901 and axially slidable relative thereto. The lower leg tube 901 includes a piston rod 986 having a damping valve adjustment shaft 938 disposed coaxially therein and axially and rotationally movable relative thereto. The damping valve adjustment shaft 938 moves axially in response to rotation of the blow off valve adjustment knob and thereby adjusts the interference of needle valve 1304 within a damping orifice 976 that extends through the center of the damping piston 974. The damping valve adjustment knob 936 is accessible from an exterior of the fork and in one embodiment is suited for manipulation by hand, thereby allowing manual adjustment of the needle valve 1304. The damping valve adjustment knob 936 is threaded through the lower end of the lower leg tube 901. When the damping valve adjustment knob 936 is selectively rotated by a user, damping valve adjustment shaft 938 moves axially in proportion to the thread helix and the shaft pushes or pulls on the damping valve adjustment shaft 938. The damping piston 974 (e.g. orifices there through) controls the flow of fluid from the compression side of the damping fluid chamber to the rebound side 1310 of the damping fluid chamber during a compression of the fork and vice versa during an extension of the fork, thereby providing a selectable damping resistance.

Optionally, a spring (not shown) is included between the damping valve adjustment shaft 938 and the needle valve 1304 so that during compression of the fork, a threshold pressure in the compression chamber 966 can overcome the preset or selected spring force (based on adjustment of the damping valve adjustment knob 936), thereby allowing the fork to "blow off" or allow damping fluid to flow through (rebound side 1310) an otherwise substantially closed piston orifice. The damping piston 974 may also include a boost valve piston such as that shown and described herein, for example, in FIG. 12.

In one embodiment, the third valve 912 is a blow-off valve of the blow-off valve assembly 907. The blow-off valve is configured for allowing the first and second suspension members to move closer together in response to a pressure imparted on the blow-off valve during a compression of a suspension member within the other suspension member. In one embodiment, the pressure is equal to or greater than a threshold pressure when a lock-out valve of the inertia valve is in a substantially inhibiting movement position.

Figure 14:
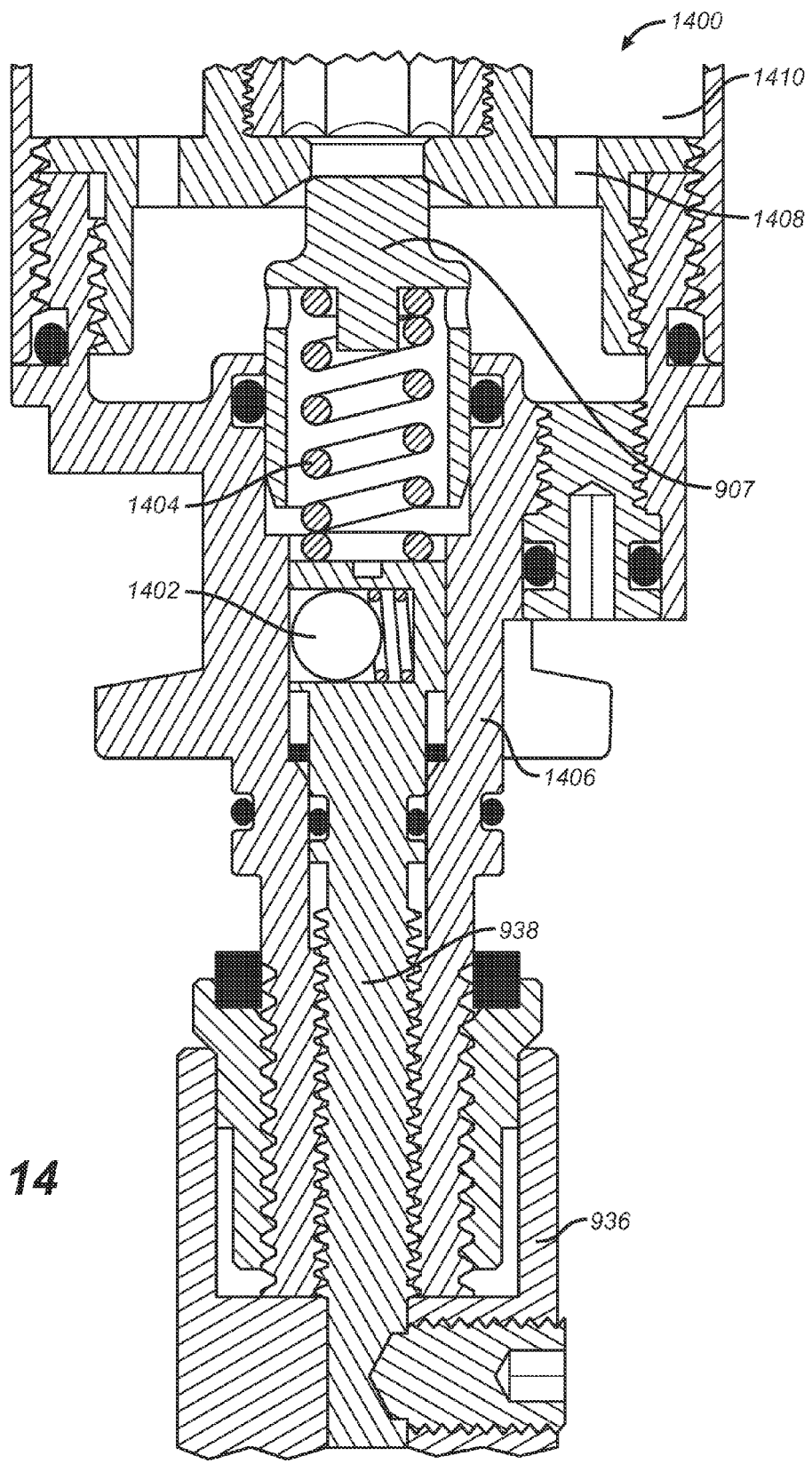
FIG. 14 is a cross-sectional view of a blow-off valve, in accordance with embodiments of the present technology.

FIG. 14 is a cross-sectional view of a blow-off valve, in accordance with embodiments of the present technology. As shown in FIG. 14, the blow off threshold is user adjustable by means of a damping valve adjustment knob 936. The damping valve adjustment knob 936 is rotationally fixed to the damping valve adjustment shaft 938 which is held incremental rotational positions relative to the lower cartridge 704 (of FIG. 7) by spring loaded ball detent mechanism 1402. Rotation of the damping valve adjustment shaft 938 causes the damping valve adjustment shaft 938 to translate axially relative to cartridge extension and correspondingly relative to spring 1404. Rotation of the damping valve adjustment knob 936 therefore, decreases or increases the preload compression in spring 1404 and therefore the seating force of the blow-off valve. When fluid pressure in the fluid reservoir 911 and compression chamber 966, multiplied times the effective seated area of the blow-off valve, exceeds the seating force of the blow-off valve, compression fluid will flow past the blow-off valve, through flow path 1408, and into recess 1410, around an exterior of the inertia valve and into the isolated suspension location 918 as previously described (e.g. via the one way shim stack valve 956). In one embodiment, the "blow-off" valve (second valve 912) of the blow-off valve assembly 907 is replaced with, or located in parallel with (or actually co-functional in that a bleed valve includes an over-pressure pop off or blow off feature), an adjustable bleed valve or other suitable inertia valve bypass valve. It is noteworthy that, in one embodiment, all compression flow passes through the same one way shim stack valve 956 regardless of whether it is by normal function or blow off. If a bump is encountered and the inertia valve does not open in a timely manner, then the blow-off valve will serve to allow the suspension damper to compress by allowing compression fluid flow to bypass the inertia valve. Lock and blow-off valve features are disclosed in U.S. Pat. No. 7,163,222, which patent is incorporated, in its entirety, herein by reference.

For example, and with reference to FIGS. 7-9E, in one embodiment, the damper assembly 700 of FIG. 7 is resistant to compression force (e.g. "locked out") until a bump is encountered, by a wheel connected to the damper assembly, that is sufficient to move the inertia valve (shown in FIG. 12) downward relative to the damper shaft. The inertia valve is biased closed over the fluidic ports 948 by the spring 335. When the fluidic ports 948 are closed, damping fluid is "locked" within fluid reservoir 911 and compression chamber 966 and cannot evacuate, thereby preventing the piston rod 986 from further entering the fluid reservoir. Since damping fluid cannot evacuate from the fluid reservoir 911 and the compression chamber 966 to compensate for the incursion of the volume of rod into the fluid reservoir 911, the damper (and associated suspension) is "locked out".

In one embodiment, the threshold pressure is operator-selectable. In another embodiment, the threshold pressure is adjustable from a location external to the first and second suspension members.

Referring now to FIG. 9D, in one embodiment, the second valve 908 includes a flow regulator 956 (such as, for example, one or more orifices optionally covered by flexible plates or "shims"). In one embodiment, the flow regulator 956 includes a one-way shim stack valve configured for controlling a damping rate by providing resistance to damping fluid flowing there through. In one embodiment, the resistance that is provided by the one-way shim stack valve against the damping fluid is adjustable. In one embodiment, the damping rate is controlled during a flow of the damping fluid towards the isolated suspension location 918. In another embodiment, the damping rate is controlled during a rebound flow of the damping fluid away from the isolated suspension location 918.

In one embodiment, for example, the one way shim stack valve 956 may be set to a predetermined resistance to control damping rate. In one embodiment, the resistance of the one way shim stack valve 956 is adjustable so that compression damping may be varied. In one embodiment (not shown), the one way shim stack valve 956 includes a one way stack allowing flow upward toward the fluid reservoir 911 and a separate one way flow path stack allowing one way flow downward from the fluid reservoir 911 to control rebound damping.

Figure 15:
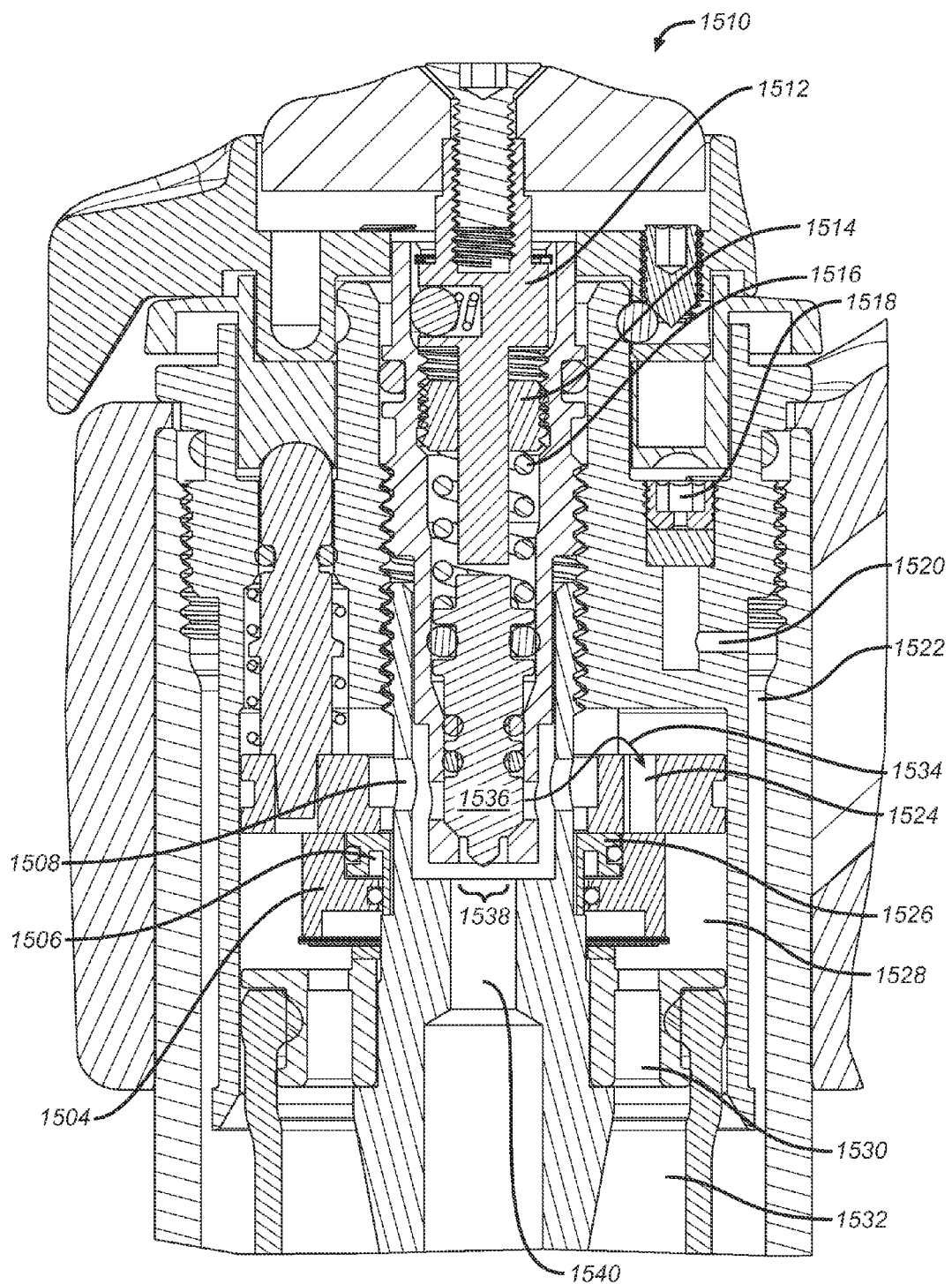
FIG. 15 is a cross-sectional view of an inertia valve, including a boost valve pair, in accordance with embodiments of the present technology.

FIG. 15 shows an inertia valve including a boost valve pair, in accordance with embodiments of the present technology. Referring now to FIGS. 9A-9E and 15, in one embodiment, the one way shim stack 956 includes a valve inner 1526 and a valve outer 1504. Thus, while the inertia valve is open, the damper becomes more resistant to compression as the piston rod 986 progresses deeper into the fluid reservoir 911 and the compression chamber 966. In such a "boost valve" embodiment, a volume 954 exterior the isolated suspension location 918 and the outer flexible tubing 928 may be pressurized with gas above atmospheric pressure to enhance the function of the boost valve pair, the valve inner 1526 and the valve outer 1504. Alternatively, a low pressure option as described herein may be used.

In one embodiment, the third valve 912 is a boost valve configured for providing increasing resistance to compression as a piston rod 986 progresses deeper into the fluid reservoir 911.

In one embodiment, a volume 954 exterior to the isolated suspension location 918 is pressurized with gas above atmospheric pressure for increasing an ability of the boost valve to resist the compression.

In one embodiment of the present technology, a damping suspension includes a first tube, a second tube telescopically receiving at least a portion of the first tube, a cylinder 915, a flexible tubing 928 coupled with the cylinder 915 and an isolated suspension location 918. In one embodiment, the cylinder 915 has an inner and outer surface 926, wherein the inner surface at least partially bounds a fluid reservoir 911. In another embodiment, the flexible tubing 928 is coupled with the first end 984 of the cylinder 915, wherein a first end of the flexible tubing 928 is sealingly compressed with a first end 984 of the cylinder 915. In one embodiment, a ring seal, as is described herein, presses the first end of the flexible tubing 928 against the outer surface 926 of the cylinder 915, such that the flexible tubing 928 becomes immobile and a seal is formed. In one embodiment, the second end of the flexible tubing 928 is retainably compressed towards a second end of the outer surface 926 of the cylinder 915. The second end of the outer surface 926 of the cylinder 915 may include the cylinder 915 itself, or parts extending from the cylinder 915. For example, in one embodiment a ring seal presses the second end of the flexible tubing 928 towards the outer surface 926 of the cylinder 926 such that the second end becomes immobile, while damping fluid is able to flow between the flexible tubing 928 and the outer surface 926 of the cylinder 926.

In one embodiment, the isolated suspension location 918 includes a fluid flow circuit 922, a first valve 910 and a second valve 908. In one embodiment, the isolated suspension location 918 is defined by the outer surface 926 of the cylinder 915 and an inner surface of the flexible tubing 928. In one embodiment, the isolated suspension location 918 has a fluid pressure cavity port (inlet 924) that is in fluidic communication with a damping suspension valve assembly. The flexible tubing 928 is configured for expanding as damping fluid enters the isolated suspension location 918 and is configured for compressing as the damping fluid leaves the isolated suspension location 918.

In one embodiment, the damping suspension valve assembly includes a fluid flow circuit 922 comprising a first end 906 in fluidic communication with the fluid reservoir 911 and a second end 916 in fluidic communication with the isolated suspension location 918.

In one embodiment of the present technology, a damping suspension valve assembly includes a fluid flow circuit 922, a first valve 910, a second valve 908 and a third valve 912. In one embodiment, the fluid flow circuit 922 includes a first end 906 in fluidic communication with the fluid reservoir 911 and a second end 916 in fluidic communication with the isolated suspension location 918. The fluid reservoir 911 receives therein a variable volume, and the isolated suspension location 918 receives a damping fluid from the fluid flow circuit 922 in response to the variable volume.

In one embodiment, the first valve 910 is positioned along the fluid flow circuit 922. The first valve 910 includes a compression chamber 966 there within and is configured for opening and closing in response to a variable pressure imparted on the first valve 910 by the damping fluid. In one embodiment, the compression chamber 966 is in fluidic communication with both the isolated suspension location 918 and the fluid reservoir 911 when the first valve 910 is open, and the compression chamber 966 is in fluidic communication with the fluid reservoir 911 when the first valve 910 is closed. In one embodiment, the first valve 910 is an inertia valve.

In one embodiment, of the damping suspension valve assembly, the second valve 908 includes an upper surface coupled with the isolated suspension location 918 and a lower surface coupled with the first valve 910 via the fluid flow circuit 922. The second valve 908 is configured for providing resistance to the damping fluid flowing along the fluid flow circuit 922. In one embodiment, the second valve 908 is a flow regulator 956 (including, in one embodiment, a one-way shim stack valve), wherein a first portion of the fluid flow circuit 922 moving there through is in series with a second portion of the fluid flow circuit 922 moving through the first valve 910.

In one embodiment, the third valve 912 is in fluidic communication with the first and second valve. The third valve 912 is configured for pushing the damping fluid towards the isolated suspension location 918 in response to a pressure imparted on the second valve 908 during compression of the damping suspension that is equal to or greater than an operator-selectable threshold pressure when the first valve 910 is in a substantially inhibiting movement position. In one embodiment, the third valve 912 is a blow-off valve.

In one embodiment, the outer flexible tube 928 acts as the floating piston assembly 202. In one embodiment, the outer flexible tube 928 may be pressurized form a source outside of the fork. Additionally, in one embodiment of the vehicle suspension damper in a leg of a fork, a variable damper is coupled with the piston assembly 202. In another embodiment, the variable damper is coupled with a ported bulkhead.

Referring again to FIG. 4, in which a two legged fork (of a vehicle, e.g., bicycle) with a suspension damper is shown in accordance with embodiments of the present technology. As described herein, the cartridge of FIG. 3 may be installed in one leg of the fork. In one embodiment and as described herein, one leg may include the vehicle suspension damper 400 of FIG. 4 and the other leg of the fork may include a spring (e.g., gas spring, mechanical spring, coil) which stores energy during compression of the fork and then releases that energy when a disparity is passed. In one embodiment, the spring is adjustable.

In one embodiment, the legs include boost valves. In another embodiment, forks include pressurized boost valves. For example, areas within the legs of the fork of FIG. 4 are capable of holding matter and may be "pressurized" from an outside source with air, gas, and/or liquid.

In one embodiment, the suspension damper includes a compression chamber, a first flow path and a second flow path. In one embodiment, the compression chamber includes a piston and rod movable therein. In one embodiment, the first flow path extends from a first compression chamber portion to a second compression chamber portion, wherein the first compression chamber portion and the second compression chamber portion is separated by the piston. In one embodiment, the second flow path extends from the compression chamber to an isolated suspension location. The second flow path traverses at least one of a terrain sensitive valve and a bypass valve. The second flow path further traverses a flow regulator, wherein at least one of the flow regulator and the terrain sensitive valve and the bypass valve is axially overlapping at least a portion of the isolated suspension location.

Figure 16:
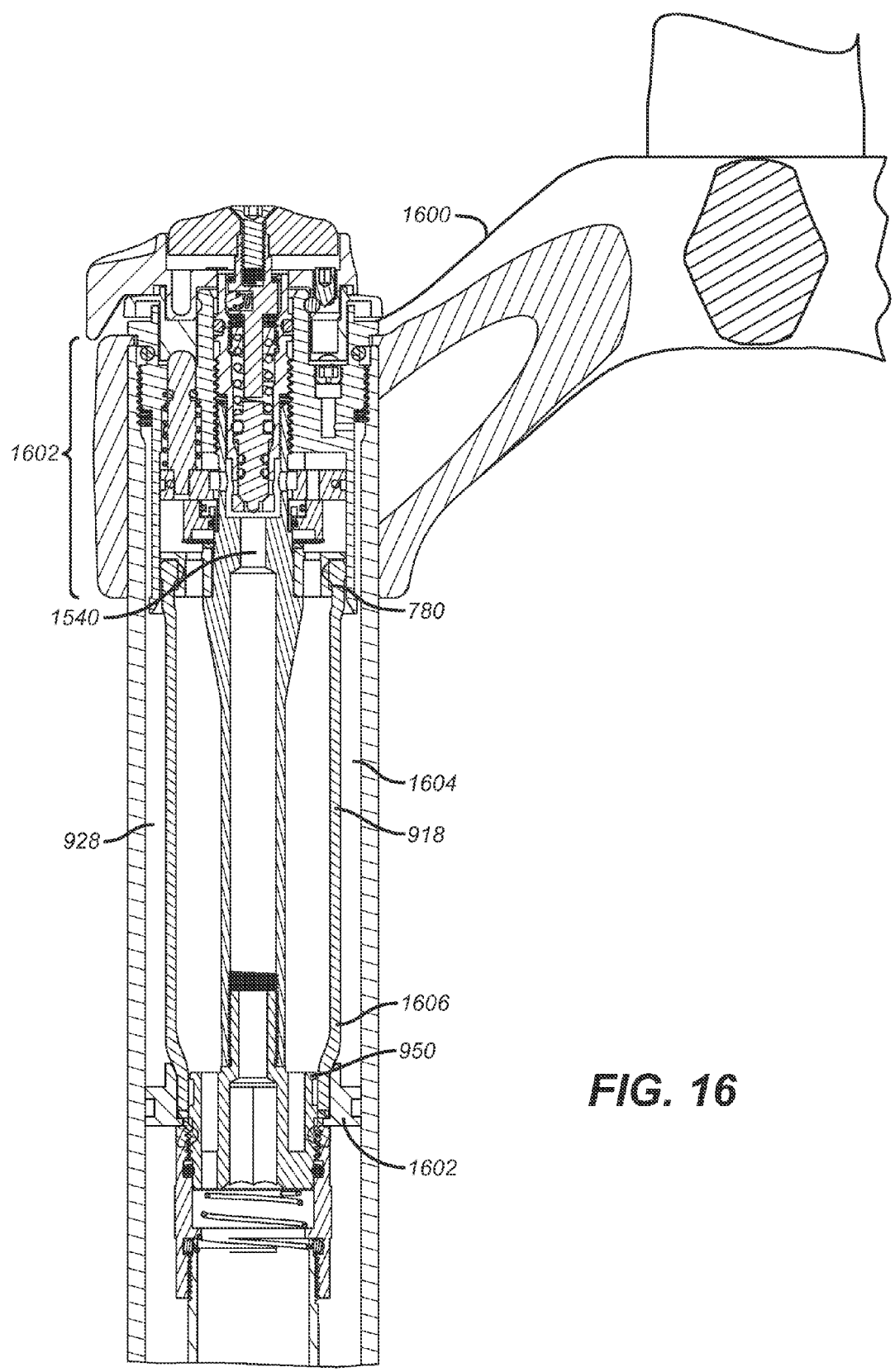
FIG. 16 is a cross-sectional view of a vehicle suspension damper of a fork, in accordance with embodiments of the present technology.

Referring now to FIG. 16, a cross-sectional view of a vehicle suspension damper 1600 and related components with a leg of a two legged fork is shown in accordance with embodiments of the present technology. The outer flexible tube 928 within the lower damper can be clearly seen.

Operation

Figure 17:
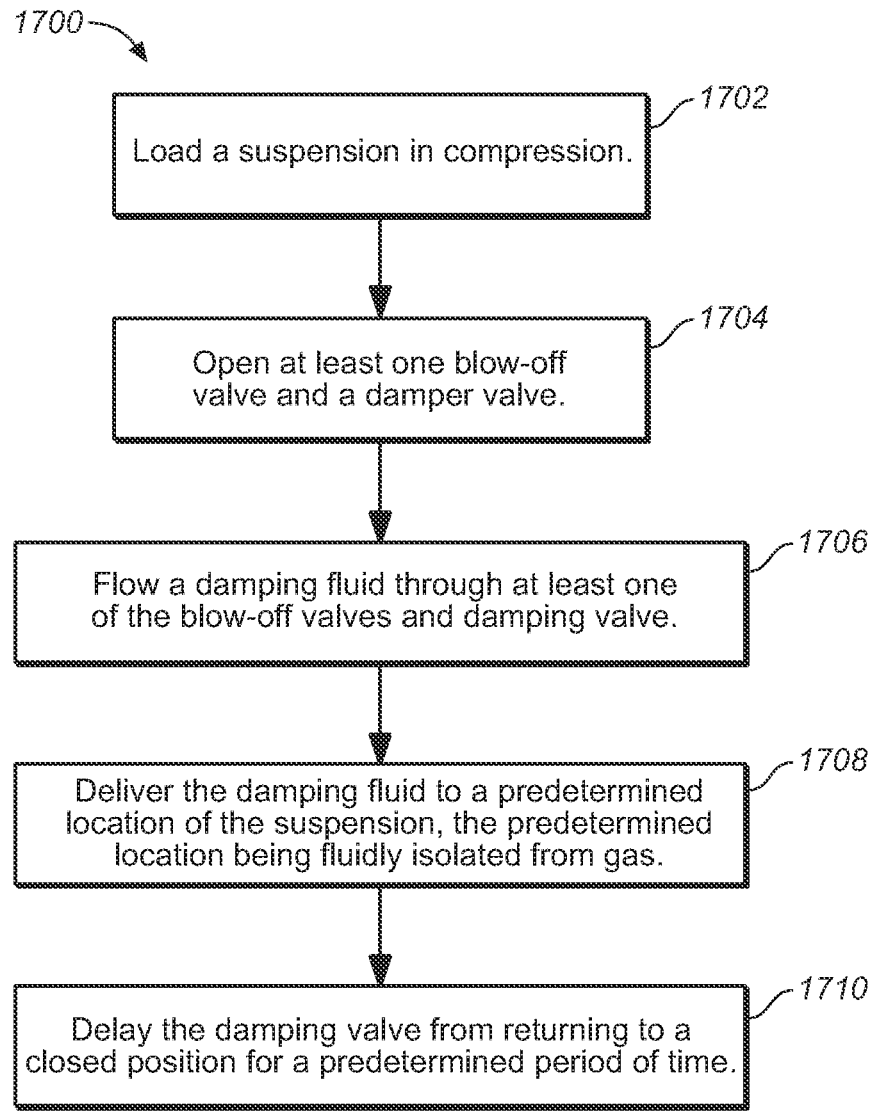
FIG. 17 is a flow of a method for unlocking a suspension, in accordance with embodiments of the present technology.

FIG. 17 is a flow chart of a method for unlocking a suspension is shown, in accordance with embodiments of the present technology. Referring now to FIGS. 9A-9E and 17, a suspension may be described as being loaded in compression. At 1704, at least one of a blow-off valve and a terrain sensitive damper valve is opened. In one embodiment, at least one of the blow-off valve and a damping valve is opened when a predetermined threshold damping fluid pressure is exceeded. In one embodiment, this predetermined threshold damping fluid pressure imparted upon the at least one of a blow-off valve and a terrain sensitive damper valve is adjusted by a pressure threshold adjustment knob.

At 1706, a damping fluid flows through the at least one of the blow-off valve and the terrain sensitive damping valve. At 1708, the damping fluid is delivered, via the flow regulator 956, to a predetermined location of the suspension, the predetermined location being fluidly isolated from gas. At 1710, the terrain sensitive damping valve is delayed from returning to a closed position for a predetermined period of time. In one embodiment, this predetermined period of time is set via a delay adjustment knob.

In one embodiment, during compression of the fork, the piston shaft 1306 progresses into the fluid reservoir 911 and rebound side 1310. As it does so, it must, because the fluid reservoir 911 and rebound side 1310 is of fixed volume, displace a volume of fluid (typically "incompressible" damping liquid such as hydraulic oil) corresponding to the volume of the piston shaft 1306 as it enters the fluid reservoir 911. The displacement of the damping fluid from the fluid reservoir 911 and rebound side 1310 affords an additional damping feature.

Referring again to FIGS. 15 and 16, the displaced fluid flows from the fluid reservoir 911 and into the compression chamber 966. From there, it continues into the throat, and then to the orifice 1538. When the damping fluid pressure at the orifice 1538 is sufficient to overcome the preload spring 1516, the damping fluid flows through the orifice 1538 and along flow paths (through a plurality of apertures 1508 disposed circumferentially about the throat body 1540) into a plurality of orifices 1520. The plurality of orifices 1520 are obstructed at a lower end by a valve outer. The valve outer 1504 is "nested" with the valve inner 1526 and an annular fluid chamber 1506 is formed between the valve outer 1504 and the valve inner 1526. In one embodiment, the annular fluid chamber 1506 is filled by gas at atmospheric pressure. When the static or "ambient" pressure of the damping fluid is greater than atmospheric, it acts to force the valve outer 1504 upwardly and the valve inner 1526 downwardly. In other words, the valve outer 1504 and the valve inner 1526 tend to become more tightly "nested". That in turn forces the valve outer 1504 against the plurality of orifices 1520. The greater the differential pressure between the damping fluid and the annular fluid chamber 1506, the greater the force will be that is exerted by the valve outer 1504 against the plurality of orifices 1520. That in turn will increase resistance to damping fluid flow through the plurality of orifices 1520 toward the flow path 1534 and will thereby increase the compressive damping force of the fork. Damping fluid flowing through the flow paths 1534 then flows into the annular fluid chamber 1506 where its pressure may be affected by gas pressure in chamber.

Referring now to FIGS. 13-16, in one embodiment, the annular fluid chamber 1506 is filled with substantially nothing and therefore contains a vacuum. That may be accomplished by engaging or "nesting" the parts, valve inner and valve outer, in a vacuum, or by pumping the annular fluid chamber 1506 down (e.g. vacuum pump) through an orifice 1538 (not shown) and then plugging the orifice 1538. When the annular fluid chamber 1506 is at vacuum, mere atmospheric pressure will be higher. In one embodiment, pressurization of the shock absorber or fork leg (e.g. through gas induction valve 1518 to chamber) may be atmospheric or slightly above atmospheric. In one low pressure embodiment, the annular bladder or floating piston is used in order to isolate a minimized volume of gas for facilitating pressure increases during a compression stroke of the suspension. In one embodiment, the annular fluid chamber 1506 serves to isolate the gas compensation chamber from the damping fluid, thereby avoiding any intermingling of the gas and the fluid (e.g. liquid oil) which would result in a reduced damping performance (due to the damping fluid becoming emulsified).

In one embodiment, the annular fluid chamber 1506 is filled with gas at above atmospheric pressure, whereby such gas pressure is specified to be greater than an initial (corresponding to an extended state of the suspension) static damping fluid pressure and corresponding gas pressure within the chamber. In such an embodiment, the gas in the annular fluid chamber 1506 biases the outer and inner valve portions away from one another (e.g. increasing the gap) until the suspension is stroked sufficiently in compression to revise the static damping fluid pressure to a value higher than that annular fluid chamber 1506 gas pressure. In one embodiment, the boost valve damping mechanism is held open until a predetermined point in the compression stroke is reached. In such an embodiment, the suspension exhibits very compliant damping characteristics until later in the compression stroke, at which point the suspension becomes more rigid (and in that way suspension "bottom out" may be mitigated). In one embodiment, a mechanical spring is placed within the annular fluid chamber 1506 such that it is in compression between the outer and inner valve halves and biases them to move apart in a manner, and with a result, similar to the foregoing description except that the spring rate may be more linear than an initial gas pressure charge "spring").

In one embodiment, the volume of the annular fluid chamber 1506 is configured in proportion to the diameter of the piston shaft 1306 and the length of the suspension stroke or the length of the piston shaft 1306 that will, at most, enter into the fluid reservoir 911 and the rebound side 1310. Such a consideration may be referred to as the "damper compression ratio". In one embodiment, the volume of the annular fluid chamber 1506 is twice the volume of the piston shaft 1306 that may enter the fluid reservoir 911 and rebound side 1310 at maximum compression stroke of the suspension or in other words the damper compression ratio is two (volume of the compensating chamber divided by the shaft volume maximum minus shaft volume [in the damping chamber] initial). In some boost valve suspension embodiments, useful compression ratios range from 1.5 to 4. In some embodiment, more particular useful compression ratios range from 2 to 3. In some fork embodiments, compression ratios may be relatively lower in a range because a fork typically operates within a vehicle system on a one to one basis (i.e. the wheel moves an inch and the fork moves an inch, whereas a shock may move ½ inch per 2 inches of wheel travel, thereby increasing the inch per inch resistance required of an effective shock. There is no levering linkage usually associated with a fork. There is often linkage associated with a rear shock.)

The ambient pressure of the damping fluid may be altered by pressurizing (in one embodiment with a compressible fluid such as a gas) the compensation chamber. In one embodiment, the isolated suspension location 918 is pressurized by adding gas, at a desired damping fluid ambient pressure, through gas induction valve 1518. The gas induction valve 1518 may be a rubber plug under a set screw, a Schrader type gas valve, a Presta type gas valve or any valve suitable for gas introduction and sealing at pressure. When the gas is introduced into the gas induction valve 1518, it flows through the plurality of orifices 1520 and into the isolated suspension location 918. In one embodiment, the isolated suspension location 918 is sealed at a lower end by an annular partition 1602 and seal in order to limit the volume of pressurized gas, consistent with a desired damping compression ratio, influencing the dimension of the upper tube (and if the upper tube is completely pressurized dimensional changes and possible binding between fork legs may occur). In one embodiment, the isolated suspension location 918 may be pressurized to 100 or 200 psi and may function at pressures from 200 to 600 psi.

Referring now to FIGS. 10 and 15, the ambient pressure of the damping fluid may be altered by pressurizing (in one embodiment with a compressible fluid such as a gas) the fluid reservoir. In one embodiment, the fluid reservoir 911 is pressurized by adding gas, at a desired damping fluid ambient pressure, through the gas induction valve 1518. The gas induction valve 1518 may be a rubber plug under a set screw, a Schrader type gas valve, a Presta type gas valve or any valve suitable for gas induction and sealing at pressure. When the gas is introduced into the gas induction valve 1518, it flows through the orifices 1520 and into the isolated suspension location 918. In one embodiment, the fluid reservoir 911 is sealed at a lower end by an annular partition 1602 and is sealed in order to limit the volume of pressurized gas influencing the dimension of the upper tube (see FIG. 13) (if the upper tube is completely pressurized dimensional changes and possible binding between fork legs may occur).

Figure 18:
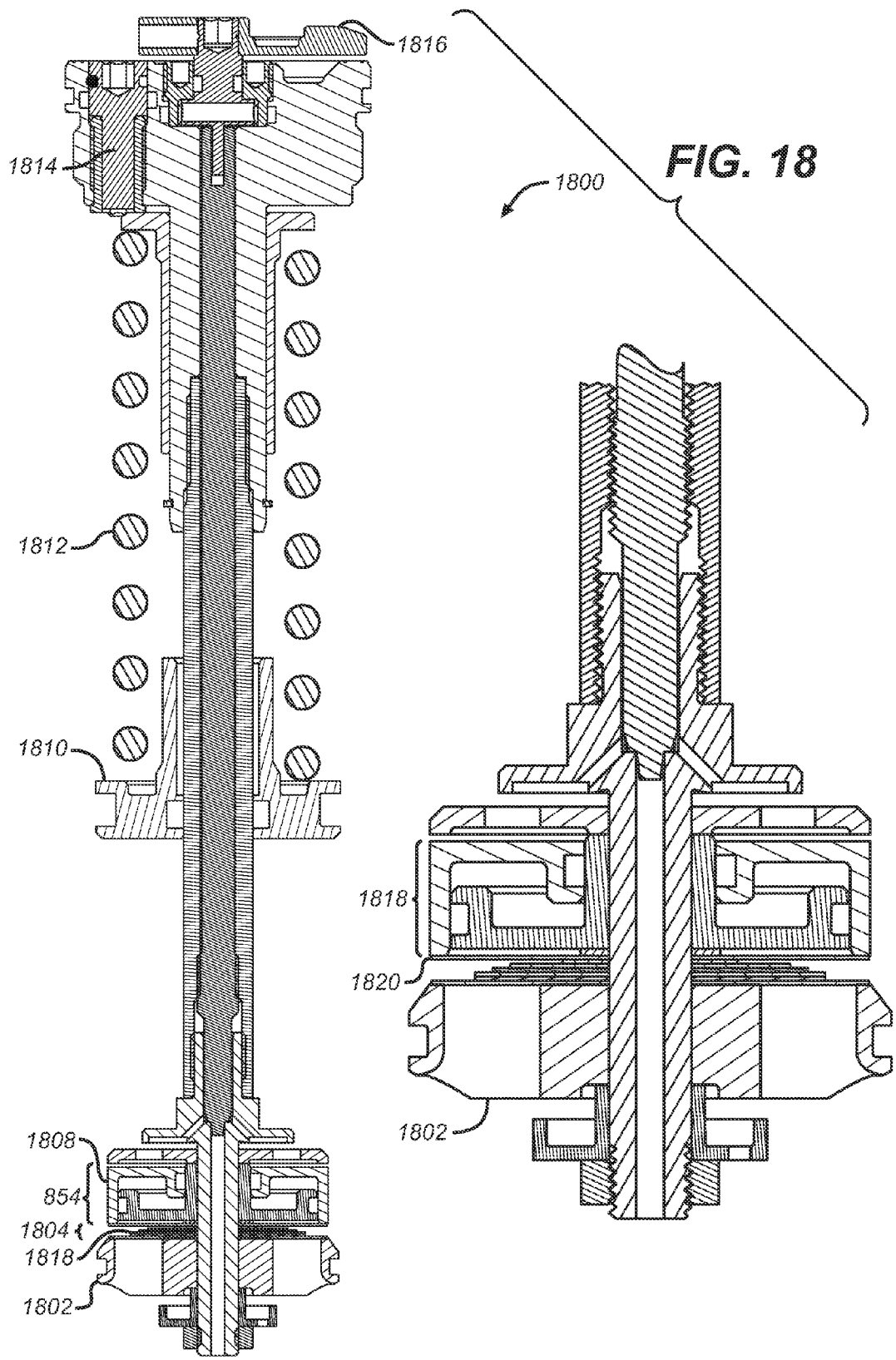
FIG. 18 is a cross-sectional view of a vehicle suspension damper of a fork, in accordance with embodiments of the present technology.

Referring now to FIG. 18, a cross sectional view of a vehicle suspension damper and related components within a fork 1800 that is configured for a motorcycle is shown in accordance with embodiments of the present technology. Shown in the fork 1800 are the following components: piston assembly 1802, variable damper 1818, movable outer valve 1808, reverse bend shim 1806, main stack of shims 1804, the first big diameter shim 1820 furthest from the piston assembly 1802, IFP chamber 1810 (similar in function to the damping fluid chamber of previous figures), compression bleed adjuster (not labeled), spring pre-load adjuster (not labeled) and IFP spring 1812.

In operation, the variable damper 1818 acts against a reverse bend shim 1806 arrangement. As the pressure in the IFP chamber 1812 increases due to compression of the fork 1800, the movable outer valve 1808 pushes against the first big diameter shim 1820 furthest from the piston assembly 1802. The first big diameter shim 1820 bends against the main stack of shims 1804, effectively increasing the stiffness of the main stack of shims 1804 as the fork 1800 is compressed.

At the beginning of travel, when the pressure of the IFP chamber 1812 is at a minimum, the variable damper 1818 is not influencing the damping force. At some point into the travel, when the reverse bend shim 1806 assembly starts to engage the main stack of shims 1804, is when the variable damper 1818 starts acting. This gives initial free movement of the fork 1800 and then produces the position-sensitive effect to the compression damping deeper in travel.

Of note, external adjustments may be made to the components of the fork 1800. For example, a compression bleed adjuster is coupled in parallel with the variable damper 1818. The compression bleed adjuster is configurable to be adjusted externally. In addition, in one embodiment, there is a spring pre-load adjuster which acts to change the pre-load on the IFP spring 1812. In one embodiment, turning the spring pre-load adjuster clockwise will increase the pre-load on the IFP spring 1812 and make the variable damper 1818 react closer to the initial part of its travel. Turning the spring pre-load adjuster will control the dive or pitch of the fork 1800 (most notable in the corners).

Another external adjustment that may be made in accordance with embodiments of the present technology is to alter the height of the external oil bath. Raising the oil height will increase the damping of the air volume in the fork 1800, thus increasing the apparent pressure of the IFP chamber 1810. Most likely, this adjustment will affect the last few inches of travel.

Referring now to FIG. 15, in one embodiment, the fork includes an adjustable damping mechanism including a metering valve 1536. The metering valve 1536 can be adjusted by rotation of the top cap 1510, which correspondingly rotates the adjuster 1512. The adjuster 1512 is non round and engages a similarly non round hole through a nut 1514. When the adjuster 1512 is rotated, the nut 1514 is rotated and also traverses its threaded housing axially. As the nut 1514 moves axially, the preload on the preload spring 1516 is correspondingly altered. Because the preloaded spring exerts an axial load on the metering valve 1536 body, the damping characteristic, or resistance to flow through the orifice is selectively and manually adjusted by turning the top cap 1510.

The pressurized gas acts almost without resistance on the damping fluid through the outer flexible tube 928. In one embodiment, the outer flexible tube 928 is made from an elastomer (or other suitable flexible material) and acts as a pressure transmitting diaphragm (annular) between the gas in the isolated suspension location 918 and the damping fluid in the isolated suspension location 918. Because the damping fluid in the annulus is in pressure communication with the entire damping fluid system including the fluid reservoir 911 and rebound side 1310, the communication of gas pressure in the fluid reservoir 911 to the fluid pressure in the isolated suspension location 918 (through the outer flexible tube 928) increases the ambient damping fluid pressure to that of the gas pressure of the isolated suspension location 918. As described herein, the ambient pressure influences the damping force exerted by the boost valve or valves included within the fork (valve outer and valve inner). As the fork compresses during a compression stroke, the volume of damping fluid displaced by the piston rod (of FIG. 7) acts to further increase the ambient damping fluid pressure in the system by compressing the gas in the isolated suspension location 918 by an amount corresponding to the piston rod 986 introduced into the compression chamber 966 and rebound side 1310.

Referring now to FIGS. 10 and 15, during compression of the fork, the piston shaft 1306 progresses into the fluid reservoir 911 and the compression chamber 966. As it does so, it must, because the fluid reservoir 911 and the compression chamber 966 is of a fixed volume, displace a volume of fluid (typically "incompressible" damping liquid such as hydraulic oil corresponding to the volume of the shaft as it enters the chamber). The displacement of damping fluid from the fluid reservoir 911 and rebound side 1310 affords an additional damping feature.

The displaced fluid flows from the fluid reservoir 911 into compression chamber 966. From there, it continues into the throat body 1540 to the orifice. When the damping fluid pressure at the orifice 1538 is sufficient to overcome the meter valve preload spring 1516, the damping fluid flows through the orifice 1538 and along the flow paths 1528 (through a plurality of apertures 1508 disposed circumferentially about the throat body 1540) into a plurality of orifices 1520.

The plurality of orifices 1520 are obstructed by the valve outer. The valve outer is nested with the valve inner and an annular fluid chamber 1506 is formed between the valve outer and the valve inner. In one embodiment, the annular fluid chamber 1506 is filled by gas at atmospheric pressure. When the "ambient" pressure of the damping fluid is greater than atmospheric, it acts to force the outer valve upwardly and the inner valve downwardly. In other words, the outer valve and the inner valve tend to become more tightly "nested". That in turn forces the outer valve against the plurality of orifices 1520. The greater the differential pressure between the damping fluid and the annular fluid chamber 1506, the greater the force will be that is exerted by the valve outer against the plurality of orifices 1520. That in turn will increase resistance to the damping fluid flow through the plurality of orifices 1520 toward the flow path 1534 and will thereby increase the compressive damping force of the fork. Damping fluid flowing through the flow paths 1534 then flows into the annular bladder interior 1532 where its pressure may be affect by gas pressure in the chamber.

While the foregoing is directed to embodiments of the present technology, other and further embodiments of the present technology may be implemented without departing from the scope of the invention, and the scope thereof is determined by the claims that follow.

What we claim is:

1. A suspension system comprising:
    a first suspension member movable relative to a second suspension member;
    a fluid reservoir having a volume, said volume variable in response to a relative movement between said first and second suspension members; and
    a fluid flow circuit having a first end in fluidic communication with said fluid reservoir and a second end in fluidic communication with an isolated suspension location, said fluid flow circuit comprising a first valve, a second valve and a third valve, wherein said first and third valves are in parallel and said second valve is in series with each of said first and third valves, wherein said isolated suspension location comprises:
        an inlet in fluidic communication with said second end of said fluid flow circuit;
        an end barrier; and
        an annular enclosing wall defining an interior fluid pressure cavity between said inlet and said end barrier, said annular enclosing wall comprising:
            an inner surface and an outer surface, wherein said inner surface of said annular enclosing wall comprises an outer surface of a cylinder, and wherein said outer surface of said annular enclosing wall comprises a flexible tubing.

2. The suspension system of claim 1, wherein said isolated suspension location further comprises:
    a first compression region configured for sealingly compressing a first end of said flexible tubing against a first end of said outer surface of said cylinder; and
    a second compression region comprising said inlet and configured for retainably compressing a second end of said flexible tubing against a second end of said outer surface of said cylinder.

3. The suspension system of claim 1, wherein said flexible tubing comprises extruded tube stock.

4. The suspension system claim 1, wherein said flexible tubing comprises pulltruded tube stock.

5. The suspension system of claim 2, wherein said first compression region comprises:
    a portion of said first end of said flexible tubing; and
    a first seal ring configured for said sealingly compressing said portion of said first end of said flexible tubing against said first end of said outer surface of said cylinder, such that said first end of said flexible tubing and said first end of said outer surface of said cylinder are sealingly squeezed shut.

6. The suspension system of claim 5, wherein said portion of said first end of said flexible tubing comprises an upset.

7. The suspension system of claim 2, wherein said second compression region comprises:
    a portion of said second end of said flexible tubing; and
    a seal ring configured for retainably compressing said portion of said second end of said flexible tubing against said second end of said outer surface of said cylinder, such that said second end of said flexible tubing and said second end of said outer surface of said cylinder are squeezed partially together to retain a first position while remaining open to a damping fluid flowing between said fluid flow circuit and said isolated suspension location.

8. The suspension system of claim 7, wherein said portion of said second end of said flexible tubing comprises an upset.

9. The suspension system of claim 1, wherein one of said first and second suspension members is an upper tube of a leg of a fork, and the other of said one of said first and second suspension members is a lower tube of said leg of said fork, and wherein said lower tube is configured for telescopically receiving said upper tube and is axially slidable relative thereto.

10. The suspension system of claim 1, further comprising:
    a knob assembly selectively rotatable, said knob assembly comprising:
        a damping valve adjustment knob configured for being rotated; and
        a damping valve adjustment shaft configured for responding to rotational movement of said damping adjustment knob, said responding comprising moving axially in proportion to a thread helix and pushing or pulling on an adjustment shaft that is coupled with a needle valve, thereby adjusting an interference of said needle valve within a damping orifice that extends through a center of a damping piston, wherein during compression or extension of said suspension system said damping piston controls a flow of a damping fluid.

11. The suspension system of claim 1, wherein said second valve comprises:
    a flow regulator configured for controlling a damping rate by providing resistance to damping fluid flowing there through, wherein a resistance provided by said flow regulator against a damping fluid is adjustable.

12. The suspension system of claim 11, wherein said damping rate is controlled during a flow of said damping fluid towards said isolated suspension location.

13. The suspension system of claim 1, wherein said damping rate is controlled during a rebound flow of said damping fluid away from said isolated suspension location.

14. The suspension system of claim 1, wherein said third valve is a boost valve configured for providing increasing resistance to compression as a piston rod progresses deeper into said fluid reservoir.

15. The suspension system of claim 14, wherein a volume exterior to said isolated suspension location is pressurized with gas above atmospheric pressure for increasing an ability of said boost valve to resist said compression.

16. A method for unlocking a suspension, said method comprising:
    loading a suspension in compression;
    opening at least one of a blow-off valve and a terrain sensitive damper valve;
    flowing a damping fluid through at least one of said blow-off valve and said terrain sensitive damping valve; and
    delivering said damping fluid, via a flow regulator, to a predetermined location of said suspension, said predetermined location being an isolated suspension location and being fluidly isolated from gas, wherein said isolated suspension location comprises:
        an inlet in fluidic communication with a second end of a fluid flow circuit;
        an end barrier; and
        an annular enclosing wall defining an interior fluid pressure cavity between said inlet and said end barrier, said annular enclosing wall comprising:
            an inner surface and an outer surface, wherein said inner surface of said annular enclosing wall comprises an outer surface of a cylinder, and wherein said outer surface of said annular enclosing wall comprises a flexible tubing.

17. The method of claim 16, wherein said opening at least one of a blow-off valve and a terrain sensitive damper valve comprises:
    opening said at least one of a blow-off valve and a damping valve when a predetermined threshold damping fluid pressure is exceeded.

18. The method of claim 17, further comprising:
    adjusting said predetermined threshold damping fluid pressure imparted upon said at least one of a blow-off valve and said terrain sensitive damper valve via an pressure threshold adjustment knob.

19. The method of claim 16, further comprising:
    delaying said damping valve from returning to a closed position for a predetermined period of time.

20. The method of claim 19, further comprising:
    setting said predetermined period of time via a delay adjustment knob.

21. A damping suspension valve assembly comprising:
    a fluid flow circuit comprising a first end in fluidic communication with a fluid reservoir and a second end in fluidic communication with an isolated suspension location, said fluid reservoir receiving therein a variable volume, and said isolated suspension location receiving a damping fluid from said fluid flow circuit in response to said variable volume;
    a first valve positioned along said fluid flow circuit, said first valve comprising a compression chamber there within and configured for opening and closing in response to a variable pressure imparted on said first valve by said damping fluid, wherein said compression chamber is in fluidic communication with both said isolated suspension location and said fluid reservoir when said first valve is open, and said compression chamber is in fluidic communication with said fluid reservoir when said first valve is closed;
    a second valve comprising an upper surface coupled with said isolated suspension location and a lower surface coupled with said first valve via said fluid flow circuit, said second valve configured for providing resistance to said damping fluid flowing along said fluid flow circuit; and
    a third valve in fluidic communication with said first and second valve, said third valve configured for pushing said damping fluid towards said isolated suspension location in response to a pressure imparted on said second valve during compression of said damping suspension that is equal to or greater than an operator-selectable threshold pressure when said first valve is in a substantially inhibiting movement position, wherein said isolated suspension location comprises:
        an inlet in fluidic communication with said second end of said fluid flow circuit;
        an end barrier; and
        an annular enclosing wall defining an interior fluid pressure cavity between said inlet and said end barrier, said annular enclosing wall comprising:
            an inner surface and an outer surface, wherein said inner surface of said annular enclosing wall comprises an outer surface of a cylinder, and wherein said outer surface of said annular enclosing wall comprises a flexible tubing.

22. The damping suspension valve assembly of claim 21, wherein said annular enclosing wall further comprises:
    a first compression region configured for sealingly compressing a first end of said flexible tubing against a first end of said outer surface of said cylinder; and
    a second compression region comprising said inlet and configured for retainably compressing a second end of said flexible tubing against a second end of said outer surface of said cylinder.

23. The damping suspension valve assembly of claim 21, wherein said second valve is a flow regulator, wherein a first portion of said fluid flow circuit moving there through is in series with a second portion of said fluid flow circuit moving through said first valve.

24. The damping suspension valve assembly of claim 21, wherein said third valve is a blow-off valve.

* * * * *